US008681609B2

(12) United States Patent
Szymanski

(10) Patent No.: US 8,681,609 B2
(45) Date of Patent: Mar. 25, 2014

(54) METHOD TO SCHEDULE MULTIPLE TRAFFIC FLOWS THROUGH PACKET-SWITCHED ROUTERS WITH NEAR-MINIMAL QUEUE SIZES

(76) Inventor: Ted H. Szymanski, Toronto (CA)

( * ) Notice: Subject to any disclaimer, the term of this patent is extended or adjusted under 35 U.S.C. 154(b) by 173 days.

(21) Appl. No.: 12/861,455

(22) Filed: Aug. 23, 2010

(65) Prior Publication Data

US 2011/0044174 A1    Feb. 24, 2011

Related U.S. Application Data

(60) Provisional application No. 61/235,875, filed on Aug. 21, 2009.

(51) Int. Cl.
*H04L 12/28* (2006.01)
(52) U.S. Cl.
USPC .......................................................... 370/229
(58) Field of Classification Search
USPC ................. 370/229–235, 412–419, 357–360; 709/227–235
See application file for complete search history.

(56) References Cited

U.S. PATENT DOCUMENTS

| | | | |
|---|---|---|---|
| 6,721,325 B1 * | 4/2004 | Duckering et al. ........ | 370/395.4 |
| 6,914,882 B2 * | 7/2005 | Merani et al. ................. | 370/230 |
| 6,959,002 B2 * | 10/2005 | Wynne et al. ................. | 370/412 |
| 6,973,036 B2 * | 12/2005 | Goetzinger et al. .......... | 370/235 |
| 7,103,051 B2 * | 9/2006 | Goetzinger et al. ....... | 370/395.4 |
| 7,142,513 B2 * | 11/2006 | Sun et al. ....................... | 370/232 |
| 7,596,086 B2 * | 9/2009 | Wang et al. ................... | 370/230 |
| 7,697,844 B2 * | 4/2010 | Guo et al. ....................... | 398/69 |
| 7,710,953 B2 * | 5/2010 | Kodialam et al. ............. | 370/369 |
| 7,769,038 B2 * | 8/2010 | Hamilton et al. ............. | 370/429 |
| 7,830,857 B2 * | 11/2010 | Li .................................. | 370/349 |
| 7,917,648 B2 * | 3/2011 | Wu et al. ........................ | 709/238 |
| 2005/0157735 A1 * | 7/2005 | Kan et al. ....................... | 370/412 |
| 2005/0271046 A1 * | 12/2005 | Bianco et al. ................. | 370/386 |
| 2006/0062231 A1 * | 3/2006 | Bianco et al. ................. | 370/412 |
| 2007/0280261 A1 | 12/2007 | Szymanski | |

OTHER PUBLICATIONS

A.K. Parekh and R.G. Galleger, "A generalized processor sharing approach to flow control in integrated service networks: the single node case", IEEE/ACM Trans. Networking, vol. 1, pp. 344-357, 1993.

A.K. Parekh and R.G. Galleger, "A generalized processor sharing approach to flow control in integrated service networks: the single node case", IEEE/ACM Trans. Networking, vol. 2, pp. 137-150, 1994.

(Continued)

*Primary Examiner* — Dmitry H Levitan

(57) ABSTRACT

A method to schedule multiple traffic flows through a multiplexer server to provide fairness while minimizing the sizes of the associated queues, is proposed. The multiplexer server minimizes a quantity called the maximum Normalized Service Lag for each traffic flow. In each time-slot, the normalized service lag of every traffic flow may be updated by adding the normalized lag increment value, whether or not there is a packet in the queue associated with the flow. In each time-slot, a multiplexer server selects a traffic flow to service with an available packet and with the maximum normalized service lag. When the traffic rate requested by each traffic flow is stable, the multiplexer server schedule may repeat periodically. Efficient methods to compute periodic schedules are proposed. The methods can be applied to packet-switched Internet routers to achieve reduced queue sizes and delay.

30 Claims, 16 Drawing Sheets

(56) References Cited

OTHER PUBLICATIONS

T.H. Szymanski, "Bounds on end-to-end delay and jitter in input-buffered and internally-buffered IP networks", IEEE Sarnoff Symposium held at Princeton University, New Jersey, in Mar./Apr. 2009, 6 pages.

D. Bertsekas and R. Gallager, "Data Networks", 2nd edition, Prentice Hall, 1992, Total 571 pages.

* cited by examiner

FIGURE 1.    (Prior Art)

```
200   Function Schedule = Schedule_GPS (F, N, rate(1:N), iVFT(1:N))

202   IIDT = inf*ones(1,N);
204   VFT = inf*ones(1,N);

206   for flow=1:N
208       if (rate(flow) > 0)
210           IIDT(flow) = F/rate(flow);
212           VFT(flow) = iVFT(flow);
214       end;
216   end;
```

FIGURE 3a

```
218   cell = ones(1,N);    % vector of next cell# to schedule per flow
219   requests = sum(rate();
219a  remaining = F;
219b  if (requests == remaining) forced = 1 else forced = 0;
220   for ts = 1:F
222       [minVFT, fmin]  = min(VFT)
224       if ((minVFT <= ts) & (cell(fmin) < rate(fmin))) || (forced == 1)
226           Schedule(ts)  = fmin;
228           cell(fmin)    = cell(fmin) + 1;
230           VFT(fmin)     = VFT(fmin) + IIDT(fmin);
231           if (cell(fmin) == rate(fmin)) { VFT(fmin) = infinity }
232       end;
234   end;
236   return( Schedule(1:F) )

240   Function iVFT = assign_first_VFT (F, N, rates(1:N), IIDT(1:N))

242   iVFT = inf*ones(1,N);
244   [all_rates all_flows] = sort( rates, 'descend');
246   ts = 0;
248   for j=1:N
250       flow = all_flows(j); rate = all_rates(j);
252       if (rate> 0)
254           ts = ts + 1;
256           iVFT(flow) = ts;
258       end;
260   end;
```

FIGURE 3b

```
270   Function Schedule = Schedule_MLF (F, N, rate(1:N))

271   Schedule = zeros(1,N);
272   IIDT = inf*ones(1,N);
273   nLAG = -inf*ones(1:N);

274   for flow=1:N
276       if (rate(flow) > 0)
278           IIDT(flow) = F/rate(flow);
280           nLAG(FLOW) = -1;
282       end;
284   end;

286   cell = ones(1,N);    % vector of next cell# to schedule per flow
288   requests = sum(rate(1:N));
289   remaining = sum(rate);
289a  if (requests == remaining) forced = 1 else forced = 0;

290   for ts = 1:F 292       for jj=1:N  {  nLAG(jj) = nLAG(jj) + 1/IIDT(jj)  }
294       [maxnLAG, fmax] = max(nLAG);

296       remaining = F-ts+1;
298       if (requests == remaining) { forced =1} else {forced = 0};

300       if ((maxnLAG >= THRESHOLD) & (cell(fmax)< rate(fmax)) ...
302           || (forced == 1)
304           Schedule(ts) = fmax;
306           cell(fmax)    = cell(fmax) + 1;
308           nLAG(fmax)   = nLAG(fmax) - 1;
310           requests = requests - 1;
311           if (cell(fmax) - rate(fmax)) { nLAG(fmax) = -infinity};
312       end;
314   end;
316   return( Schedule(1:F) )
```

FIG. 5A: Table 5.1: Method Schedule_GPS, N=4, F=16, rate vector = [1,2,4,8], all VFTs initially 0:

| time-slot | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| VFT: | 0.000 | 16.000 | 16.000 | 16.000 | 16.000 | 16.000 | 16.000 | 16.000 | 16.000 | 16.000 | 16.000 | 16.000 | 16.000 | 16.000 | 16.000 | 16.000 |
| VFT: | 0.000 | 0.000 | 8.000 | 8.000 | 8.000 | 8.000 | 8.000 | 8.000 | 8.000 | 8.000 | 8.000 | 16.000 | 16.000 | 16.000 | 16.000 | 16.000 |
| VFT: | 0.000 | 0.000 | 0.000 | 4.000 | 4.000 | 4.000 | 8.000 | 8.000 | 8.000 | 8.000 | 12.000 | 12.000 | 12.000 | 12.000 | 16.000 | 16.000 |
| VFT: | 0.000 | 0.000 | 0.000 | 0.000 | 2.000 | 4.000 | 4.000 | 6.000 | 8.000 | 8.000 | 8.000 | 10.000 | 12.000 | 12.000 | 14.000 | 16.000 |
| flow: | 1 | 2 | 3 | 4 | 4 | 3 | 4 | 4 | 2 | 3 | 4 | 4 | 3 | 4 | 4 | 0 |

| time-slot | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| VFT: | 16.000 | 32.000 | 32.000 | 32.000 | 32.000 | 32.000 | 32.000 | 32.000 | 32.000 | 32.000 | 32.000 | 32.000 | 32.000 | 32.000 | 32.000 | 32.000 |
| VFT: | 16.000 | 16.000 | 24.000 | 24.000 | 24.000 | 24.000 | 24.000 | 24.000 | 24.000 | 32.000 | 32.000 | 32.000 | 32.000 | 32.000 | 32.000 | 32.000 |
| VFT: | 16.000 | 16.000 | 16.000 | 20.000 | 20.000 | 20.000 | 24.000 | 24.000 | 24.000 | 24.000 | 28.000 | 28.000 | 28.000 | 28.000 | 32.000 | 32.000 |
| VFT: | 16.000 | 16.000 | 16.000 | 16.000 | 18.000 | 20.000 | 20.000 | 22.000 | 24.000 | 24.000 | 24.000 | 26.000 | 28.000 | 28.000 | 30.000 | 32.000 |
| flow: | 1 | 2 | 3 | 4 | 4 | 3 | 4 | 4 | 2 | 3 | 4 | 4 | 3 | 4 | 4 | 0 |

FIG. 5B: Table 5.2: Method Schedule_GPS, N=4, F=16, rate vector = [1,2,4,8], all VFTs assigned using method Assign_First_VFTs:

| time-slot | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| VFT: | 3.000 | 3.000 | 3.000 | 3.000 | 3.000 | 19.000 | 19.000 | 19.000 | 19.000 | 19.000 | 19.000 | 19.000 | 19.000 | 19.000 | 19.000 | 19.000 |
| VFT: | 2.000 | 2.000 | 2.000 | 10.000 | 10.000 | 10.000 | 10.000 | 10.000 | 10.000 | 10.000 | 10.000 | 18.000 | 18.000 | 18.000 | 18.000 | 18.000 |
| VFT: | 1.000 | 1.000 | 5.000 | 5.000 | 5.000 | 5.000 | 5.000 | 9.000 | 9.000 | 9.000 | 13.000 | 13.000 | 13.000 | 13.000 | 17.000 | 17.000 |
| VFT: | 0.000 | 2.000 | 2.000 | 2.000 | 4.000 | 4.000 | 6.000 | 6.000 | 8.000 | 10.000 | 10.000 | 10.000 | 12.000 | 14.000 | 14.000 | 16.000 |
| flow: | 4 | 3 | 2 | 1 | 4 | 4 | 4 | 3 | 4 | 4 | 2 | 1 | 4 | 4 | 3 | 4 |

| time-slot | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| VFT: | 19.000 | 19.000 | 19.000 | 19.000 | 19.000 | 19.000 | 19.000 | 19.000 | 35.000 | 35.000 | 35.000 | 35.000 | 35.000 | 35.000 | 35.000 | 35.000 |
| VFT: | 18.000 | 18.000 | 18.000 | 26.000 | 26.000 | 26.000 | 26.000 | 26.000 | 26.000 | 26.000 | 26.000 | 34.000 | 34.000 | 34.000 | 34.000 | 34.000 |
| VFT: | 17.000 | 17.000 | 21.000 | 21.000 | 21.000 | 21.000 | 21.000 | 25.000 | 25.000 | 25.000 | 29.000 | 29.000 | 29.000 | 29.000 | 33.000 | 33.000 |
| VFT: | 16.000 | 18.000 | 18.000 | 18.000 | 20.000 | 21.000 | 22.000 | 22.000 | 24.000 | 26.000 | 26.000 | 26.000 | 28.000 | 30.000 | 30.000 | 32.000 |
| flow: | 4 | 3 | 2 | 1 | 4 | 3 | 3 | 3 | 4 | 4 | 2 | 1 | 4 | 4 | 3 | 4 |

FIG. 5C: Table 5.3: Method Schedule_MNLF, N=4, F=16, rate vector = [1,2,4,8]:

| time-slot | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| nLAG: | -0.938 | -0.875 | -0.812 | -0.750 | -0.688 | -0.625 | -0.562 | -1.500 | -1.438 | -1.375 | -1.312 | -1.250 | -1.188 | -1.125 | -1.062 | -1.000 |
| nLAG: | -0.875 | -0.750 | -0.625 | -1.500 | -1.375 | -1.250 | -1.125 | -1.000 | -0.875 | -0.750 | -0.625 | -1.500 | -1.375 | -1.250 | -1.125 | -1.000 |
| nLAG: | -0.750 | -1.500 | -1.250 | -1.000 | -0.750 | -1.500 | -1.250 | -1.000 | -0.750 | -1.500 | -1.250 | -1.000 | -0.750 | -1.500 | -1.250 | -1.000 |
| nLAG: | -1.500 | -1.000 | -1.500 | -1.000 | -1.500 | -1.000 | -1.500 | -1.000 | -1.500 | -1.000 | -1.500 | -1.000 | -1.500 | -1.000 | -1.500 | -1.000 |
| flow: | 4 | 3 | 4 | 2 | 4 | 3 | 4 | 1 | 4 | 3 | 4 | 2 | 4 | 3 | 4 | 0 |

FIGURE 6.1

FIG. 6A: Table 6.1: Method Schedule_GPS, N=4, F=16, rate vector = [1,2,3,7], all VFTs 0s:

| time-slot | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| VFT: | 0.000 | 16.000 | 16.000 | 16.000 | 16.000 | 16.000 | 16.000 | 16.000 | 16.000 | 16.000 | 16.000 | 16.000 | 16.000 | 16.000 | 16.000 | 16.000 |
| VFT: | 0.000 | 0.000 | 8.000 | 8.000 | 8.000 | 8.000 | 8.000 | 8.000 | 16.000 | 16.000 | 16.000 | 16.000 | 16.000 | 16.000 | 16.000 | 16.000 |
| VFT: | 0.000 | 0.000 | 0.000 | 5.333 | 5.333 | 5.333 | 5.333 | 10.667 | 10.667 | 10.667 | 10.667 | 11.429 | 13.714 | 13.714 | 16.000 | 16.000 |
| VFT: | 0.000 | 0.000 | 0.000 | 0.000 | 2.286 | 4.571 | 6.857 | 6.857 | 9.143 | 9.143 | 11.429 | 11.429 | 0 | 0 | 0 | 0 |
| flow: | 1 | 2 | 3 | 4 | 4 | 4 | 3 | 4 | 2 | 4 | 3 | 4 | 0 | 4 | 0 | 4 |

| time-slot | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| VFT: | 16.000 | 32.000 | 32.000 | 32.000 | 32.000 | 32.000 | 32.000 | 32.000 | 32.000 | 32.000 | 32.000 | 32.000 | 32.000 | 32.000 | 32.000 | 32.000 |
| VFT: | 16.000 | 16.000 | 24.000 | 24.000 | 24.000 | 24.000 | 24.000 | 24.000 | 32.000 | 32.000 | 32.000 | 32.000 | 32.000 | 32.000 | 32.000 | 32.000 |
| VFT: | 16.000 | 16.000 | 16.000 | 21.333 | 21.333 | 21.333 | 26.667 | 26.667 | 26.667 | 26.667 | 26.667 | 27.429 | 29.714 | 29.714 | 32.000 | 32.000 |
| VFT: | 18.286 | 18.286 | 18.286 | 18.286 | 20.571 | 22.857 | 22.857 | 25.143 | 25.143 | 25.143 | 27.429 | 27.429 | 0 | 0 | 0 | 0 |
| flow: | 1 | 2 | 3 | 4 | 4 | 3 | 4 | 0 | 2 | 4 | 3 | 4 | 0 | 4 | 0 | 4 |

| time-slot | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| VFT: | 32.000 | 32.000 | 48.000 | 48.000 | 48.000 | 48.000 | 48.000 | 48.000 | 48.000 | 48.000 | 48.000 | 48.000 | 48.000 | 48.000 | 48.000 | 48.000 |
| VFT: | 32.000 | 32.000 | 32.000 | 40.000 | 40.000 | 40.000 | 40.000 | 40.000 | 40.000 | 48.000 | 48.000 | 48.000 | 48.000 | 48.000 | 48.000 | 48.000 |
| VFT: | 37.333 | 37.333 | 37.333 | 37.333 | 37.333 | 37.333 | 42.667 | 42.667 | 42.667 | 42.667 | 42.667 | 43.429 | 45.714 | 45.714 | 48.000 | 48.000 |
| VFT: | 34.286 | 34.286 | 34.286 | 34.286 | 36.571 | 38.857 | 38.857 | 41.143 | 41.143 | 41.143 | 43.429 | 43.429 | 0 | 0 | 0 | 0 |
| flow: | 3 | 1 | 2 | 4 | 4 | 3 | 4 | 0 | 2 | 4 | 3 | 4 | 0 | 4 | 0 | 4 |

| time-slot | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|
| VFT: | 48.000 | 64.000 | 64.000 | 64.000 | 64.000 | 64.000 | 64.000 | 64.000 | 64.000 | 64.000 | 64.000 | 64.000 | 64.000 | 64.000 | 64.000 | 64.000 |
| VFT: | 48.000 | 48.000 | 56.000 | 56.000 | 56.000 | 56.000 | 56.000 | 56.000 | 56.000 | 64.000 | 64.000 | 64.000 | 64.000 | 64.000 | 64.000 | 64.000 |
| VFT: | 48.000 | 48.000 | 48.000 | 53.333 | 53.333 | 53.333 | 58.667 | 58.667 | 58.667 | 58.667 | 58.667 | 59.429 | 61.714 | 61.714 | 64.000 | 64.000 |
| VFT: | 50.286 | 50.286 | 50.286 | 50.286 | 52.571 | 54.857 | 54.857 | 57.143 | 57.143 | 57.143 | 59.429 | 59.429 | 0 | 0 | 0 | 0 |
| flow: | 1 | 2 | 3 | 4 | 4 | 3 | 4 | 0 | 2 | 4 | 3 | 4 | 0 | 4 | 0 | 4 |

FIG. 6B: Table 6.2: Method Schedule_GPS, N=4, F=16, rate vector = [1,2,3,7].

FIGURE 6.2 and FIGURE 6.3

| time-slot | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| VFT | 3.000 | 3.000 | 3.000 | 3.000 | 3.000 | 19.000 | 19.000 | 19.000 | 19.000 | 19.000 | 19.000 | 19.000 | 19.000 | 19.000 | 19.000 | 19.000 |
| VFT | 2.000 | 2.000 | 2.000 | 10.000 | 10.000 | 10.000 | 10.000 | 10.000 | 10.000 | 10.000 | 10.000 | 18.000 | 18.000 | 18.000 | 18.000 | 18.000 |
| VFT | 1.000 | 1.000 | 6.333 | 6.333 | 6.333 | 6.333 | 6.333 | 11.667 | 11.667 | 11.667 | 11.667 | 11.667 | 11.667 | 17.000 | 17.000 | 17.000 |
| VFT | 0.000 | 2.286 | 2.286 | 2.286 | 4.571 | 4.571 | 6.857 | 6.857 | 9.143 | 9.143 | 11.429 | 11.429 | 13.714 | 13.714 | 16.000 | 16.000 |
| flow | 4 | 3 | 2 | 4 | 1 | 4 | 3 | 4 | 2 | 4 | 3 | 4 | 1 | 4 | 0 | 4 |

| time-slot | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| VFT | 19.000 | 19.000 | 19.000 | 19.000 | 19.000 | 35.000 | 35.000 | 35.000 | 35.000 | 35.000 | 35.000 | 35.000 | 35.000 | 35.000 | 35.000 | 35.000 |
| VFT | 18.000 | 18.000 | 18.000 | 26.000 | 26.000 | 26.000 | 26.000 | 26.000 | 26.000 | 26.000 | 26.000 | 34.000 | 34.000 | 34.000 | 34.000 | 34.000 |
| VFT | 17.000 | 17.000 | 22.333 | 22.333 | 22.333 | 22.333 | 22.333 | 27.667 | 27.667 | 27.667 | 27.667 | 27.667 | 27.667 | 33.000 | 33.000 | 33.000 |
| VFT | 18.286 | 18.286 | 18.286 | 18.286 | 20.571 | 20.571 | 22.857 | 22.857 | 25.143 | 25.143 | 27.429 | 27.429 | 29.714 | 29.714 | 32.000 | 32.000 |
| flow | 0 | 3 | 2 | 4 | 1 | 4 | 3 | 4 | 2 | 4 | 3 | 4 | 1 | 4 | 0 | 4 |

| time-slot | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| VFT | 35.000 | 35.000 | 35.000 | 35.000 | 35.000 | 51.000 | 51.000 | 51.000 | 51.000 | 51.000 | 51.000 | 51.000 | 51.000 | 51.000 | 51.000 | 51.000 |
| VFT | 34.000 | 34.000 | 34.000 | 42.000 | 42.000 | 42.000 | 42.000 | 42.000 | 42.000 | 42.000 | 42.000 | 50.000 | 50.000 | 50.000 | 50.000 | 50.000 |
| VFT | 33.000 | 33.000 | 38.333 | 38.333 | 38.333 | 38.333 | 38.333 | 43.667 | 43.667 | 43.667 | 43.667 | 43.667 | 43.667 | 49.000 | 49.000 | 49.000 |
| VFT | 34.286 | 34.286 | 34.286 | 34.286 | 36.571 | 36.571 | 38.857 | 38.857 | 41.143 | 41.143 | 43.429 | 43.429 | 45.714 | 45.714 | 48.000 | 48.000 |
| flow | 0 | 3 | 2 | 4 | 1 | 4 | 3 | 4 | 2 | 4 | 3 | 4 | 1 | 4 | 0 | 4 |

| time-slot | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|
| VFT | 51.000 | 51.000 | 51.000 | 51.000 | 51.000 | 67.000 | 67.000 | 67.000 | 67.000 | 67.000 | 67.000 | 67.000 | 67.000 | 67.000 | 67.000 | 67.000 |
| VFT | 50.000 | 50.000 | 50.000 | 58.000 | 58.000 | 58.000 | 58.000 | 58.000 | 58.000 | 58.000 | 58.000 | 66.000 | 66.000 | 66.000 | 66.000 | 66.000 |
| VFT | 49.000 | 49.000 | 54.333 | 54.333 | 54.333 | 54.333 | 54.333 | 59.667 | 59.667 | 59.667 | 59.667 | 59.667 | 59.667 | 65.000 | 65.000 | 65.000 |
| VFT | 50.286 | 50.286 | 50.286 | 50.286 | 52.571 | 52.571 | 54.857 | 54.857 | 57.143 | 57.143 | 59.429 | 59.429 | 61.714 | 61.714 | 64.000 | 64.000 |
| flow | 0 | 3 | 2 | 4 | 1 | 4 | 3 | 4 | 2 | 4 | 3 | 4 | 1 | 4 | 0 | 4 |

FIG. 6C: Table 6.3: Method Schedule_MNLF, N=4, F=16, rate vector = [1,2,3,7]. using method Assign_First_VFTs.

| time-slot | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| nLAG | -0.938 | -0.875 | -0.812 | -0.750 | -0.688 | -0.625 | -0.562 | -1.500 | -1.438 | -1.375 | -1.312 | -1.250 | -1.188 | -1.125 | -1.062 | -1.000 |
| nLAG | -0.875 | -0.750 | -0.625 | -0.500 | -1.375 | -1.250 | -1.125 | -1.000 | -0.875 | -0.750 | -0.625 | -1.500 | -1.375 | -1.250 | -1.125 | -1.000 |
| nLAG | -0.812 | -0.625 | -1.438 | -1.250 | -1.062 | -0.875 | -0.688 | -0.500 | -0.312 | -1.125 | -0.938 | -0.750 | -0.562 | -1.375 | -1.188 | -1.000 |
| nLAG | -0.562 | -1.125 | -0.688 | -1.250 | -0.812 | -1.375 | -0.938 | -0.500 | -1.062 | -0.625 | -1.188 | -0.750 | -1.312 | -0.875 | -1.438 | -1.000 |
| flow | 4 | 3 | 2 | 4 | 1 | 4 | 3 | 4 | 2 | 4 | 3 | 4 | 1 | 4 | 0 | 4 |

```
400   Function Schedule = Recursive_Schedule (V, Fc, RS, iVFT, Ts, Te)
402   global N, Fi, Fs, IIDT, initial_VFTs;

406   if (Fc > Fs)
408       Va = floor ( V / 2 )
410       Vb = Va
412       Vrem = V - Va - Vb;
414       mid_time = Ts + F/2;
416       [Pa, Pb] = partition_ones_GPS(F, Va, Vb, Vrem, RS, mid_time)  OR
416a      [Pa, Pb] = partition_ones_MNLF(F, Va, Vb, Vrem, RS, mid_time)

418       RSa = RS;
420       iVFTa = iVFT;
421       Ts1 = Ts;   Te1 = Ts + F/2;
422       ScheduleA = Recursive_Schedule (Va+Pa, Fc/2, RSa, iVFTa,Ts1, Te1)

424       RSb = RS + RSa;
426       iVFTb = initial_VFTs + (RSb-ones(1,N)) *IIDT;
428       Ts2 = Ts1+1;   Te2 = Ts2 + F/2;

430       ScheduleB = Recursive_Schedule(Vb+Pb, Fc/2, RSb, iVFTb, Ts2, Te2)

432       Schedule = [ScheduleA, ScheduleB]

434   else   % Fc must equal Fs; use GPS tor MNLF to schedule vector V

436       Schedule = Schedule_Interval_GPS(V, Fc, RS, iVFT, Ts, Te)

438   end;
```

FIGURE 9

```
440   Function Schedule = Schedule_Interval(V, Fc,RS, iVFT, Ts, Te)
442   global N, Fi, Fs, IIDT;

444   Schedule = zeros(1,Fc)

446   if (GPS == True)
450        Schedule = Schedule_interval_GPSI(Fs, N, V(1:N), iVFT);
452   elseif (MNLF == True)
454        Schedule = Schedule_interval_MNLF(Fs, N, V(1:N), iVFY, RS);
456   end;
```

FIGURE 10

```
480  Function [Pa pb] = Partition_ones_GPS (F, Va, Vb, Vrem, RS, mid_time )
482  global     N, Rates, IIDT, initVFT 486  Pa = zeros(1,N);
488  Pb = zeros(1,N);

490  for j=1:N
492       if (Vrem(j) == 1) & (rate(j) > 0)
494            VFT(j) = initVFT(j) + (RS(j)+1)*IIDT(j)
496       end;
498  end;

500  [all_VFTs all_flows] = sort(VFT, 'ascend');
502  free_a = (F/2) - sum(Va);
504  free_b = (F/2) - sum(Vb);
505  if (free_a + free_b == sum(Vrem)) { forced = 1} else {forced = 0};

506  for j = 1..N
508       f = all_flows(j);
510       if ((f >0) & (Vrem(f)==1) & (VFT(f) <= mid_time) & (free_a > 0)) || (forced == 1)
512            Pa(f) = Pa(f) + 1;
514            free_a = free_a - 1;
516       elseif ((f >0) & (Vrem(f) == 1)  & (VFT(f) >= mid_time) & (free_b > 0)) || (forced == 1)
518            Pb(f) = Pb(f) + 1;
520            free_b = free_b - 1;
522       end;
524  end;
```

FIGURE 11a

```
480 Function [Pa pb] = Partition_ones_MNLF (F, Va, Vb, Vrem, RS, mid_time )
482 global     N, Rates, IIDT, 486 Pa = zeros(1,N);
488 Pb = zeros(1,N);
490 nLAG = -infinity* ones(1,N);

492 for j=1:N
494     if (Vrem(j) == 1) & (rate(j) > 0)
496         nLAGT(j) =  (mid_time -  (RS(j)+1)*IIDT(j))/IIDT(j)
498     end;
500 end;

502 [all_LAGs all_flows] = sort(nLAG, 'decend');
504 free_a = (F/2) - sum(Va);
506 free_b = (F/2) - sum(Vb);
507 if (free_a + Free_b = sum(Vrem)) {forced = 1} else { forced = 0};

508 for j = 1..N
510     flow = all_flows(j);
512     if ((flow >0) & (Rates(flow) > 0) & (nLAG(flow) >= THRESHOLD) & (free_a > 0))|(forced==1)
514         Pa(j) = Pa(j) + 1;
516         free_a = free_a - 1;
518     elseif ((flow >0) & (Rates(flow) > 0) & (free_b > 0)) | (forced == 1)
520         Pb(j) = Pb(j) + 1;
522         free_b = free_b - 1;
524     end;
526 end;
```

FIGURE 11b $$\begin{pmatrix} 171 & 75 & 98 & 118 & 109 & 119 & 199 & 135 \\ 120 & 180 & 130 & 127 & 78 & 237 & 42 & 110 \\ 139 & 24 & 153 & 124 & 142 & 237 & 93 & 112 \\ 128 & 156 & 100 & 177 & 98 & 69 & 227 & 69 \\ 264 & 145 & 181 & 93 & 96 & 81 & 94 & 70 \\ 69 & 121 & 148 & 59 & 135 & 46 & 146 & 300 \\ 44 & 193 & 105 & 85 & 255 & 148 & 80 & 114 \\ 89 & 130 & 109 & 241 & 111 & 87 & 143 & 114 \end{pmatrix}$$

METHOD TO SCHEDULE MULTIPLE TRAFFIC FLOWS THROUGH PACKET-SWITCHED ROUTERS WITH NEAR-MINIMAL QUEUE SIZES

CROSS-REFERENCE TO RELATED APPLICATIONS

This application claims the benefit of the filing date of U.S. provisional application No. 61/235,875 filed on Aug. 21, 2009, the contents of which are hereby incorporated by reference.

BACKGROUND OF THE INVENTION

The present invention relates to the scheduling of traffic flows in the routers of a telecommunications network.

DESCRIPTION OF THE PRIOR-ART

The GPS/WFQ Scheduling Algorithm (Prior Art)

The well-known 'Generalized Processor Sharing' (GPS) server scheduling algorithm is often used in the Internet network to provide fairness guarantees. The algorithm is typically used to schedule multiple traffic flows which pass through one multiplexer server onto one transmission link, to provide fairness guarantees to all competing traffic flows. The GPS algorithm has a discrete-time implementation called the 'Weighted Fair Queueing' (WFQ) algorithm. The GPS-WFQ algorithms were formalized by Dr. Parekh in his PhD. thesis at MIT, and were published by Parekh and Gallager in 1991. The GPS/WFQ algorithms can provide deterministic guarantees on the end-to-end delay experienced by packets traversing one path through a packet-switched network such as the Internet, under certain restrictive assumptions.

The paper by A. K. Parekh and R. G. Gallager, entitled "A Generalized Processor Sharing Approach to Flow Control in Integrated Service Networks: the Single Node Case", IEEE/ACM Trans. Networking, vol. 1, pp. 344-357, 1993 is incorporated by reference. A second paper by the same authors entitled "A Generalized Processor Sharing Approach to Flow Control in Integrated Service Networks: the Multiple Node Case", IEEE/ACM Trans. Networking, vol. 2, no. 2, pp. 137-150, 1994 is incorporated by reference. These 2 papers are hereafter referred to as the GPS-papers.

Consider a multiplexer server which services N traffic flows contending for access to one outgoing transmission link. The multiplexer server is also called the 'server'. The GPS algorithm can be used to schedule the N traffic flows as they pass through the multiplexer server onto the transmission line. The GPS algorithm assumes an idealized multiplexer server which uses a 'fluid' model of data packets, where a packet can be sub-divided so that infinitesimally small amounts of each packet can be served. The idealized server visits all N traffic flows in a round-robin order in each 'round' of service. It serves a very small amount of each queued packet for each traffic flow in each round, thereby providing relatively 'smooth' service to each traffic flow. Once the last bit of a packet is served by the idealized server, the packet is labeled as 'served', its departure time is recorded, and it is removed from the system. The GPS algorithm can be used to compute a departure time for all packets passing through the one multiplexer server onto the one outgoing transmission link, and it has been rigorously proved to achieve fairness for all traffic flows.

The departure schedule determined by the idealized server using the GPS scheduling algorithm can be used by a real multiplexer. The real multiplexer server can be called the Weighted Fair Queueing (WFQ) server. In the WFQ server packets are nondivisible entities. The WFQ server services packets in the same order as the ideal GPS server, thereby achieving a level of fairness in the service to each flow.

The GPS-WFQ scheduling algorithms are currently used to provide fairness guarantees in packet-switched Internet routers. We demonstrate that the GPS-WFQ algorithms do not minimize the queue sizes for the associated traffic flows. We propose a new server scheduling algorithm called the Maximum-Normalized-Lag-First (MNLF) scheduling algorithm. The proposed algorithm can be used to schedule the N traffic flows to pass through one multiplexer server onto one transmission line, to provide fairness guarantees, and to minimize the size of the associated queues.

The primary difficulty with the GPS-WFQ scheduling algorithm is that it does not minimize the queue sizes of traffic flows passing through a multiplexer. This patent application illustrates that an important consideration of a scheduling algorithm is the maximum normalized service lag which it can guarantee. The service lag of a traffic flow can be defined as the number of bytes of data behind service a flow has fallen, when compared to the ideal or perfect schedule for that traffic flow. The normalized service lag of a traffic flow can be defined as the number of average size packets behind service a flow has fallen, when compared to the ideal or perfect schedule for that traffic flow, assuming that all traffic flows use the same average packet size. The normalized lag can also be expressed as a time delay. It will be established in this document that the GPS-WFQ algorithm does not minimize the maximum normalized service lag of all traffic flows. Therefore, the GPS-WFQ algorithm does not minimize the queue sizes of the traffic flows.

It has recently been established in theory that the maximum amount of data stored in a queue is bounded by 2 values: (a) the maximum normalized service lag of the service schedule for the queue, and (b) the maximum normalized service lag of the incoming traffic. Therefore, a server scheduling algorithm with an unnecessarily large maximum normalized service lag will have larger queues than necessary. This observation is important, since the GPS-WFQ algorithms are often used to provide fair service in Internet routers, and they do not minimize the normalized service lag. Therefore, in principle the size of many queues in the Internet may be reduced by replacing the GPS-WFQ algorithms with another algorithm which minimizes the maximum normalized service lag. The proposed MNLF algorithm can achieve these goals.

Objects and Advantages

Accordingly, it is desirable to find a new multiplexer server scheduling algorithm which can minimize the queue sizes for all traffic flows passing through the multiplexer server.

The proposed MNLF algorithm achieves near-minimal queue sizes for the traffic flows. In many applications, the size of the queues can be reduced by replacing the GPS/WFQ algorithms by the proposed MNLF algorithm.

The proposed MNLF algorithm is easy to implement in hardware or software. The amount of computation is limited, and hardware circuits which compute schedules should easily handle the highest link speeds, i.e.,10 Gbps, 40 Gbps, 160 Gbps, 640 Gbps, etc.

The proposed MNLF algorithm is iterative. In each time-slot a few simple calculations are performed and the packet to service is identified. The proposed MNLF algorithm can use variable-sized packets or fixed-sized packets.

Consider traffic flows with 'Guaranteed Rates' which do not change over an extended period of time. Guaranteed-Rate traffic flows will be denoted GR traffic flows in this document. When GR traffic flows are scheduled through one multiplexer server, the computed server schedules will repeat after some duration of time, which can be called a 'scheduling frame'. A scheduling frame consists of F time-slots, for some integer F. It is desirable to avoid recomputing the same server schedules repeatedly when the traffic rates do not change. A method by which the computed server schedule for a scheduling frame is computed and stored, and reused in subsequent scheduling frames, is proposed. This approach will reduce power consumption in the hardware, and it will also allow a control processor the opportunity to download other schedules computed in software.

The proposed MNLF algorithm can achieve 100% utilization of the outgoing transmission link, and guarantees that the maximum normalized service lag is near minimal. Therefore, it guarantees that the sizes of queues for the traffic flows will be near-minimal. In many systems, the amount of memory required to implement queues can be reduced.

New traffic flows can be added or removed incrementally, without substantially affecting the other traffic flows in the server. The traffic rates of existing flows can be changed, without substantially affecting the other traffic flows in the server.

The proposed MNLF server does not require any 'speedup' in order to achieve 100% throughput of the outgoing transmission line. The method works with a speedup of one and achieves up to 100% throughput, while minimizing the maximum normalized service lag and the associated queue sizes.

The proposed iterative MNLF method is relatively fast, with a worst-case run time of O(F log N) when computing a schedule for N flows over a scheduling frame of duration F time-slots and when executed in a serial processor.

To compute schedules very quickly, a recursive and parallel GPS scheduler is proposed. The parallel version has considerably faster run-times compared to the serial version when executed in a multiple-processor implementation, such as the new multi-core Intel processors. Assuming P processors are available for computation, the run-time is approx. O((F log N)/P).

To compute lower jitter schedules very quickly, a recursive and parallel MNLF scheduler is proposed. The parallel version has considerably faster run-times compared to the serial version when executed in a multiple-processor implementation, such as the new multi-core Intel processors. Assuming P processors are available for computation, the run-time is approx. O((F log N)/P).

In a real Internet router, the proposed MNLF scheduler can be used to schedule multiple traffic flows which share a resource, such a transmission line. In many Internet routers, a hierarchy of 2 levels of schedulers is useful. A method to use a hierarchy of MNLF schedulers is proposed. The hierarchy of servers can provide guaranteed traffic rates along with maximum service lag bounds to any number of traffic flows. It also allows for the control of how much link bandwidth is allocated to each set of traffic flows competing for one output link.

SUMMARY OF THE INVENTION

In accordance with embodiments of the present invention, a method to schedule multiple traffic flows through a multiplexer server to provide fairness guarantees, while simultaneously minimizing the sizes of the associated queues, is proposed. To minimize the sizes of the associated queues, the multiplexer server may minimize a quantity called the maximum Normalized Service Lag for each traffic flow. Every traffic flow to be scheduled through a multiplexer server is assigned two values, an initial Normalized Service Lag value, and a Normalized Lag Increment value. In each time-slot, the normalized service lag of every traffic flow is updated by adding the normalized lag increment value. In each time-slot, a multiplexer server selects a traffic flow to service with an available packet and with the maximum normalized service lag. Efficient software and hardware methods for performing the iterative calculations are presented. When the traffic rate requested by each traffic flow is stable, the multiplexer server schedule will repeat periodically. Efficient methods to compute periodic schedules are proposed. The periodic schedules can be stored and reused. The methods can be applied to multiple traffic classes, such as Guaranteed-Rate traffic flows and Best-Effort traffic flows. The methods can be applied to packet-switched Internet routers to achieve near-minimal queue sizes and near-minimal delays.

In accordance with another aspect of the present invention, there is provided a method to schedule N traffic flows through a multiplexer server system. The multiplexer server system comprises a queue for each of the N traffic flows, a multiplexer server, and an outgoing link, wherein each of the N traffic flows has an associated weight equaling the fraction of the outgoing link capacity requested by the flow. The method comprises (a) assigning each of the N traffic flows an initial normalized lag value, (b) processing each of the N traffic flows and assigning each of the N traffic flows a normalized lag increment value, equaling an ideal inter-departure time for average sizes packets associated with that traffic flow divided by the time-slot duration, (c) in each increment of the time-slot clock, processing the N traffic flows and adding the normalized lag increment value to the normalized lag value associated with each of the N traffic flows, (d) in each increment of the time-slot clock during which the outgoing link is idle, processing the N traffic flows and selecting one packet associated with one of the N traffic flows for transmission over the outgoing link, the one of the N traffic flows having the largest normalized lag value which exceeds a given threshold value, (e) removing one packet from the queue associated with the one of the N traffic flows, transmitting the packet over the outgoing transmission line for K time-slots, and decrementing the normalized lag value associated with the one of the N traffic flows by K times the normalized lag increment value.

In accordance with another aspect of the present invention, there is provided a method to schedule traffic flows through an input port associated with a switching matrix. The input port comprises multiple Virtual Output Queues (VOQs), one server, and one outgoing link associated with a switching matrix, wherein each of the VOQs stores packets associated with a subset of the N traffic flows, and wherein packets within one VOQ request a common output port of the switching matrix. The method comprises steps of (a) assigning each of said N VOQs a weight equaling the fraction of the capacity of the outgoing link requested by said VOQ, (b) wherein the server selects the VOQs for transmission onto the outgoing link such that traffic associated with each of the N VOQ is transmitted over the outgoing link with a bounded normalized service lead/lag.

In accordance with yet another aspect of the present invention, there is provided a method to schedule multiple Guaranteed-Rate (GR) traffic flows through an input port associated with a switching matrix. The input port comprises N Virtual Output Queues (VOQs), one VOQ-server, and one outgoing link associated with a switching matrix, the outgoing link called a port link, each of the VOQs comprising multiple flow-VOQs, one gated flow-server and one outgoing link connected indirectly or directly to the VOQ-server, each of the outgoing links called a VOQ-link, each of the flow-VOQs storing packets associated with one of the GR traffic flows, (a) wherein each VOQ is assigned a weight equalling the fraction of the capacity of the outgoing port link requested by the VOQ, (b) wherein the VOQ-server selects VOQs for service in proportion to the weight of the VOQ, (c) wherein each gated flow-server associated with each VOQ receives control signals called enable signals from the VOQ-server, and selects one GR traffic flow for transmission onto the outgoing VOQ-link in response to an enable signal, such that each of said GR traffic flows is transmitted over the outgoing port link with a bounded normalized service lead/lag.

In accordance with another aspect of the present invention, there is provided a method to schedule N traffic flows through a multiplexer server system. The method comprises multiplexer server system comprising a queue for each of the traffic flows, a gated multiplexer server responsive to an enable signal, and an outgoing link, wherein each of the traffic flows has an associated weight equaling the fraction of the outgoing link capacity the requested by the flow. The method comprises steps of (a) assigning each traffic flow an initial normalized lag value, (b) processing each traffic flow and assigning each traffic flow a normalized lag increment value, the normalized lag increment value equaling the ideal inter-departure time for average sizes packets associated with the flow divided by the time-slot duration, (c) in each increment of the time-slot clock, processing the N traffic flows and adding the normalized lag increment value to the normalized lag value associated with each traffic flow, (d) in each increment of the time-slot clock during which the outgoing link is idle and the enable signal is asserted, processing the N traffic flows and selecting one packet associated with one traffic flow for transmission over the outgoing link, the one traffic flow having the largest normalized lag value, (e) removing one packet from the queue associated with the one traffic flow, transmitting the packet over the outgoing transmission line for K time-slots, and decrementing the normalized lag value associated with the one traffic flow by K times the normalized lag increment value.

All packets have a fixed maximum size, and each packet can be transmitted over the outgoing link in a fixed number of time-slots.

In accordance with an embodiment of the present invention, there is provided a method to schedule N traffic flows through a multiplexer server system. The multiplexer server system comprises a queue for each of the traffic flows, a gated multiplexer server responsive to an enable signal, an outgoing link, and a virtual time clock, where each of the traffic flows has an associated weight equaling the fraction of the outgoing link capacity the requested by the flow. The method comprises steps of (a) assigning each traffic flow an initial virtual finishing time value, (b) each time a packet associated with one traffic flow arrives at an empty queue, assigning the packet an associated virtual finishing time equaling the current virtual time plus a value equaling the length of the packet in bits divided by the weight of the traffic flow, (c) each time a new packet with index j associated with one traffic flow arrives at a non-empty queue, assigning the new packet with index j an associated virtual finishing time equaling the virtual time of the packet with index (j-1) in said queue in plus a value equaling the length of the new packet in bits divided by the weight of the traffic flow, (d) in each increment of the time-slot clock during which the outgoing link is idle and the enable signal is asserted, processing the N traffic flows and selecting one packet associated with one traffic flow for transmission over said outgoing link, said one traffic flow having the largest virtual finishing time, (e) removing said one packet from the queue associated with said one traffic flow, and transmitting said one packet over the outgoing transmission line for K time-slots.

In accordance with yet another embodiment of the present invention, there is provided a method to schedule N Guaranteed-Rate (GR) traffic flows through N paths in a network. The network comprises switches and links, each of the paths comprising a sequence of switches and one outgoing link associated with each of the switches, wherein multiple GR traffic flows may be scheduled through a common switch when their paths intersect at the common switch, wherein each of the GR traffic flows has an associated weight equaling the fraction of the outgoing link capacity requested by the GR traffic flow at each of the switches in the paths, wherein (a) the first switch in each of the paths schedules the associated GR traffic flow for transmission on the associated outgoing links with a bounded normalized service lead/lag, (b) the subset of N GR traffic flows arriving at any of the switches in any of the N paths will each have a bounded normalized service lead/lag, (c) each of the switches in each of the N paths will schedule the GR traffic flows arriving at the switch onto the associated outgoing links such that each GR traffic flow departing on an outgoing link will have a bounded normalized service lead/lag.

At least one of the switches in the network schedules at least one of the GR traffic flows.

BRIEF DESCRIPTION OF THE DRAWINGS

In the figures, which illustrate embodiments of the invention by way of example only.

FIG. 3a illustrates the proposed method Schedule_GPS, a modification of the regular GPS algorithm. FIG. 3b illustrates the proposed method Assign_First_VFTs.

FIG. 4 illustrates the method Schedule_MNLF.

FIGS. 5A, 5b and 5C illustrate several tables of schedules computed by the method Schedule_GPS and the method Schedule_MNLF, for an example with N=4 flows, F=16 time-slots, and a rate vector of [1 2 4 8] time-slot requests per flow.

FIGS. 6A, 6B and 6C illustrate several tables of schedules computed by the method Schedule_GPS and the method Schedule_MNLF, for an example with N=4 flows, F=16 time-slots, and a rate vector of [1 2 3 7] time-slot requests per flow.

FIG. 9 illustrates the method Recursive_Schedule.

FIG. 10 illustrates the method Schedule_Interval.

FIG. 11a illustrates the method Partition_Ones_GPS.

FIG. 11b illustrates the method Partition_Ones_MNLF.

DETAILED DESCRIPTION

The GPS Equations (Prior Art)

Figure 1:
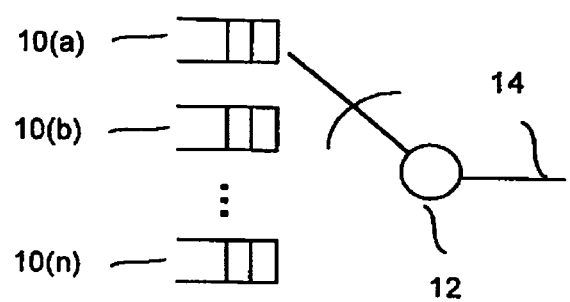
FIG. 1 illustrates the basic GPS-WFQ multiplexer server.

Consider a system of N traffic flows arriving at one multiplexer server 12, as shown in FIG. 1. The system has N queues 10(a), ..., 10(n), for the N traffic flows and one output transmission link 14 with capacity C bits/sec. The purpose of the multiplexer server 12 is to select packets for service from the queues 10 for transmission to the output transmission link 14. Assume each traffic flow is identified by an integer f, where f=1 ... N. Each traffic flow f has its own queue 10 and its own weight w(f) which reflects the fraction of the outgoing link capacity C which the flow is guaranteed to receive. The weight can be expressed as a fraction between 0 and 1, or it can be expressed as the maximum number of bits serviced in the flow in one round, when the flow receives service from an ideal GPS server. Assume that each queue 10 can store an infinite number of packets, so that packets are never dropped due to queue overflow. The GPS algorithm works for variable-size packets or fixed-sized packets of data which are called cells.

We assume the server 12 in FIG. 1 is an 'ideal' GPS server, i.e., it visits each queue in a round-robin order, and services a small number of bits in the Head-of-Line (HOL) packet in each queue in each round of service. In practice, it is infeasible for any real server to split an HOL packet into individual bits for service; therefore, this GPS server is an idealization of a real system. However, it is useful because it can be used to compute an 'ideal departure schedule' which can provide an approximate upper bound on the fairness for all flows with packets which traverse a real multiplexer switch.

As shown in the GSP-papers by Parekh and Gallager, the performance of the GPS server is succinctly described by 2 equations which are iteratively solved. Let VFT denote the 'Virtual Finishing Time' of an HOL packet. (Hereafter, we will use the term 'packet' to denote a variable-size packet or a fixed-sized cell.). There is a global virtual-time clock R, which records current virtual time measured in 'rounds' of service completed. When the ideal GPS server has visited all queues in one round of service, the virtual time R is incremented by 1.

Assume the packets associated with a traffic flow f are labeled with integers k, for k=1 ... infinity. Let P(k,f) denote packet k of flow f, and let L(k,f) denote the length of the packet in bits. Let w(f) denote the number of bits served for this flow per round of service. When packet P(k,f) with L(k,f) bits arrives at an empty queue for traffic flow f, the packet assigned a Virtual Finishing Time VFT(k,f) as follows:

$$VFT(k,f)=R+L(k,f)/w(f) \quad (1)$$

The VFT(k,f) of the packet equals the current virtual time R plus as many rounds of service as needed to transfer the L(k,f) bits in the packet to the output side of the server.

Every traffic flow f is assigned a VFT(f) equal to the VFT (k,f) of its Head-of-Line (HOL) packet, if an HOL packet exists. Otherwise, the traffic flow is assigned a VFT=infinity, i.e. a traffic flow f with an empty queue has a VFT(f)=infinity. When the Virtual Time R reaches the VFT(f) for flow f, the HOL packet P(k,f) in the queue for traffic flow f will be completely transferred from the queue to the output transmission link by the ideal GPS server. The packet will be completely serviced and can be removed from the queue. The departure time for a packet from flow f can be added to the ideal departure schedule computed by the GPS server.

When a packet P(k,f) with L(k) bits arrives at an non-empty queue f, it is assigned a VFT(k,f) as follows:

$$VFT(k,f)=VFT(k-1,f)+L(k,f)/w(f) \quad (2)$$

The VFT for this packet equals the VFT of the packet ahead of it in queue f, plus as many rounds of service as needed to transfer the L(k,f) bits in the packet to the output side of the multiplexer switch.

The GPS Service Guarantees (Prior Art)

According to the 1$^{st}$ paper by Parekh and Gallager (page 345), let Sj(t1,t2) denote the amount of traffic which has been served in the interval of time (t1,t2) for flow j.

Property (1): Every flow f is guaranteed to receive its 'fair share' of the output link capacity C. Its fair share is given by: w(f)/(sum of w(k) for all flows k=1 ... N)

Property (2): If there is any 'excess bandwidth' available on the output link, this excess bandwidth is shared fairly amongst all traffic flows with queued packets. Therefore, the following inequality holds for all flows:

$$\frac{S_i(t1, t2)}{S_j(t1, t2)} \geq \frac{w(i)}{w(j)}, \quad j = 1, 2, \ldots N \quad (3)$$

The above GPS server description is an idealization, since it is impractical to split a packet into individual bits for service. In a real server, packets or cells are serviced as non-divisible entities. The departure order of packets in the ideal GPS server schedule can be used to determine the departure order of indivisible packets in a real server. We will call the real multiplexer server the WFQ server. The variable-size packets are transmitted from the queues to the outgoing transmission line on the output side of the WFQ server in the same order as the idealized order computed by the GPS server. Let VFT(f) denote the VFT for each flow f. A flow with an empty queue has VFT(f)=infinity. In each round of service R, the traffic flow to service in the WFQ server is selected, as the following line demonstrates. We assume the syntax of the Matlab programming language, developed by the Mathworks, described at http:www.mathworks.com.

$$(VFTmin, fmin)=min(VFT(1:f)) \quad (4)$$

The min( ) function in equation 4 processes all flow VFTs and finds the flow with the minimum VFT. The variable VFTmin returned by Eq. 4 equals the smallest VFT of all flows with queued packets. If there is at least one non-empty queue, the variable VFTmin equals the smallest VFT, and fmin is the index of the flow with this VFT. If VFTmin=infinity, then all queues are empty and no flow is serviced in this round.

A complication occurs when multiple flows share the same virtual finishing time. In this case, equation 4 has several flows to select from. The GPS papers by Parekh and Gallager did not explicitly state how to resolve this issue, as any choice will satisfy the two earlier guaranteed fairness properties. In any round of service, given a set of flows which have the same minimum VFT, we can assume (a) the random selection of one flow from the set, or (b) the selection of the flow f with the minimum index f, thereby enforcing a round-robin order on the flows in the set. We will assume a round-robin order.

The real WFQ server serves packets in the order dictated by the last equation (4), the same order as the idealized GPS server. In each round of service, one non-empty flow with the smallest VFT is selected for service. Its entire HOL packet is moved by the WFQ server to the output link, as a non-divisible entity. Once the packet k is serviced, the VFT for the flow is updated to the VFT of the new HOL packet k+1 in the queue.

Application of GPS to Scheduling Guaranteed-Rate Traffic Flows with Fixed-Sized Cells (Prior Art)

If all traffic flows have the GR property and all packets have a fixed size, then equations (1) and (2) can be simplified. This section describes the adjustments to equations (1) and (2). Every fixed sized packet is called a cell, and a cell may contain for example 64, 256 or 1K bytes of data. When packets have a fixed size, each round of service in the WFQ server equals one time-slot of duration.

When a cell k of traffic flow f arrives at an empty queue, it is assigned a VFT(k,f) given by Eq. (5), where R is the current time-slot.

$$\text{VFT}(k,f) = R + \text{IIDT}(f) \quad (5)$$

The variable VFT(k,f) equals the current time-slot R plus a quantity called the IIDT(f) for traffic flow f. The IIDT(f) for a traffic flow f equals the 'Ideal Interdeparture Time' between successive cells in the traffic flow. The IIDT(f) of a traffic flow f equals $1/w(f)$, when w(f) is expressed as a fraction between 0 and 1. For example, a traffic flow with a weight w(f)=0.5 uses 50% of the capacity of the outgoing transmission link. Ideally, one cell departs every 2 time-slots and the IIDT(f)=2 time-slots for this flow. As another example, a traffic flow with a weight w(f)=⅓ uses 33% of the capacity of the outgoing transmission link. Ideally, one cell departs every 3 time-slots and the IIDT(f)=3 time-slots for this traffic flow.

When a cell k of traffic flow f arrives at a non-empty queue j, it is assigned a VFT shown in Eq. (6).

$$\text{VFT}(k,f) = \text{VFT}(k-1,f) + \text{IIDT}(f) \quad (6)$$

The variable VFT(k,f) for the arriving cell equals the virtual finishing time of the cell ahead of it in the queue, plus the IIDT(f) for this traffic flow.

In the real WFQ server, the fixed-size cells are transmitted from the queues to the output transmission link in the same order as computed by the ideal GPS schedule. In each time-slot t, the WFQ server identifies a cell to potentially service as follows.

$$(\text{VFTmin}, f\text{min}) = \min(\text{VFT}(1;f)) \quad (7)$$

The variable VFTmin equals the smallest VFT of all flows which have queued cells. If there is at least one non-empty queue, the VFTmin equals the smallest VFT, and fmin is the index of the flow with this VFT.

The WFQ server services traffic flows in the order dictated by Equation 7, thereby using the same departure schedule as the ideal GPS server. In each time-slot t, one non-empty flow with the smallest VFT is selected for service. Once the packet k is serviced, the VFT(f) for the flow f is assigned to the VFT of the new HOL packet k+1 in the queue for flow f. In the special case where we considering, the VFT of the next packet in the queue is given by the following equation:

$$\text{VFT}(f) = \text{VFT}(f) + \text{IIDT}(f) \quad (8)$$

Excess Bandwidth Sharing (Prior Art):

The ideal GPS server algorithm allows excess bandwidth to be fairly shared. Bandwidth sharing is useful when the queues are 'backlogged'. If the outgoing link capacity C is not fully reserved by the traffic flows, the excess bandwidth can be used by backlogged traffic flows. It is possible to disable this excess bandwidth sharing. In fact, to minimize the maximum normalized service lag we disable this bandwidth sharing. In the real WFQ server, the following equation can be used to select the flow for service in each time-slot t, such that each flow receives it guaranteed fraction w(f) of the link capacity C over any sufficiently long interval of time and no more that its guaranteed fraction w(f):

```
if (VFTmin <= current time-slot)
    the flow fmin is serviced       (9)
else
    the time-slot is idle.
end;
```

If the traffic flow f=fmin is serviced, its VFT(f) is updated by adding the IIDT(f) for the flow, as shown in Equation 8. Otherwise, the time-slot remains idle and the VFT(f) of flow f=fmin remains unchanged.

The Service Lead-Lag

The following results were established in the paper by T. H. Szymanski, "*Bounds on the End-to-End Delay and Jitter in Input-Buffered and Internally Buffered IP Networks*", presented at the IEEE Sarnoff Symposium held at Princeton University, New Jersey, in March/April 2009, which is hereby incorporated by reference.

Consider a real WFQ server with N traffic flows, where each flow requests a fraction w(f) of the outgoing link capacity C, where the sum of w(f) for f=1 ... N equals 1, i.e., the outgoing transmission link is fully loaded. Assume the packet size is fixed and that time starts at time-slot=0.

Definition: The 'service time' of cell k of flow f is defined as the time-slot the cell is served by the server and is denoted S(k,f).

Definition: The 'Inter-Departure time' of cell k of flow f, denoted IDT(k,f), is defined as the number of time-slots between the service of cells k and k−1, i.e., IDT(k,f)=S(k,f)−S(k−1,f), for cells k>=2.

Definition: The 'Ideal Inter-Departure time' of cells in flow f, denoted IIDT(f), is defined as the ideal number of time-slots between the service of cells k and k−1 in an ideal schedule, i.e., IIDT(f)=1/w(f). If a flow f requests 100% of the output link capacity, its IIDT(f)=1 time-slot. If a flow f requests w(f)=33% of the output link capacity, its IIDT(f)=1/0.33=3 time-slots.

Definition: The 'Real Received Service' of flow f at time t, denoted R(f,t) is equal to the integer-valued number of cells which have been served by the WFQ server in the interval of time-slots 1 ... t.

Definition: The 'Jitter' between cells k and k−1 of flow f, denoted J(k,f), is equal to the deviation between the inter-departure time of cell k and the IIDT(f) for the traffic flow f, i.e., J(k,f)=IDT(k,f)−IIDT(f), for cells k>=2. Define the 'average jitter' of a traffic flow f to be the average of the cell jitters J(k,f) for all cells k=2 ... infinity. Similarly, define the 'minimum jitter' or 'maximum jitter' of a traffic flow f to be the minimum or maximum of the cell jitters J(k,f) for all cells k=2 ... infinity, respectively.

Definition: The 'Ideal Received Service' of flow f at time t, denoted IRS(f,t), is equal to the real-valued number of cells which have been served by an server (which never experiences any contention for the output link) in the interval of time-slots 1 ... t.

Definition. The 'Service-Lead-Lag' of a cell k of flow f at time t, denoted LAG(k,f,t), is the difference between the real service time of cell k of flow f relative to the ideal service time of cell k in flow f that an ideal server would provide. Assuming that all flows are assumed to start service at time t=0, the service-lead-lag is given by:

$$\text{LAG}(k,f,t) = S(k,f) - k \cdot \text{IIDT}(f) \quad (10)$$

Equation 10 expresses the service lag in time-slots. Observe that a positive LAG(f,t)>0 denotes how many time-slots behind service cell k of flow f has fallen at time-slot t. We call a positive LAG(k,f,t) a 'service lag'. Observe that a negative LAG(k,f,t)<0 denotes how many time-slots ahead of service cell k of flow f has become at time-slot t. We call a negative LAG(k,f,t) a 'service lead'.

An important performance metric of any scheduling algorithm is the difference between the largest positive lag and the smallest negative lead. This metric affects the size of any queue and it is desirable to minimize this value. Observe that the LAG definition can be adjusted to select any starting time for a flow. The net affect of defining a starting time for a flow is to adjust the actual LAG value, but the difference between the largest positive lag and the smallest negative lead does not change when we select a new starting time.

Definition. The 'Normalized Service-Lead-Lag' of a cell k of flow f at time t, denoted nLAG(k,f,t), is the lag value for cell k of flow f at time t divided by the IIDT(f) for the flow f.

Assuming that all flows are assumed to start service at time t=0, the normalized service-lead-lag is given by:

$$nLAG(k,f,t) = (S(k,f) - k \cdot IIDT(f))/IIDT(f) \quad (11)$$

Observe that a positive nLAG(k,f,t)>0 denotes how many cells (or fixed-size packets) behind service cell k of flow f has fallen at time-slot t. We call a positive nLAG(k,f,t) a 'service lag'. Observe that a negative nLAG(k,f,t)<0 denotes how many cells ahead of service the flow has become at time-slot t. We call a negative SLL(f,t) a 'service lead'. An important performance metric is the difference or spread between the largest positive normalized lag and the smallest negative normalized lead. This metric affects the size of any queue and it is desirable to minimize this value.

While the above definitions apply to Guaranteed-Rate (GR) traffic flows with fixed-sized cells, they are easily extended to non-GR traffic flows or traffic flows with variable-size packets. To handle variable-size packets, we can define a fixed-sized cell to equal one byte, and use the previous definitions to define a normalized service lag expressed as the number of bytes behind service a flow has fallen, relative to an ideal schedule.

The service lead or service lag are related to the jitter, but they are not equal as the following example shows.

A Theory on Queue-Sizes

The following theorem was established in the paper by T. H. Szymanski, "*Bounds on the End-to-End Delay and Jitter in Input-Buffered and Internally Buffered IP Networks*", which was earlier incorporated by reference.

Theorem 1: Given a traffic flow f traversing a queue Q over an interval of time where the arriving traffic stream has a maximum normalized service lead/lag of <=K cells, and where the server has a maximum normalized service lead/lag of <=K cells, then the queue will contain at most 4K cells.

Theorem 1 states that any queue which meets the next 2 conditions will have a finite and bounded number of queued cells over all time t: (a) the queue is fed by a traffic stream with a maximum Normalized Service Lead-Lag (NSLL) of K cells, and (b) the queue is served by a server with a maximum NSLL of K cells.

The importance of this theorem is that all queues that meet these conditions do not need to have infinite capacity. Referring to the GPS server system in FIG. 1, the queues need only have a capacity of 4K cells, rather than infinite capacity, if the arriving traffic and departing traffic have bounded normalized service lead/lags.

EXAMPLE

A Bounded Jitter with an Unbounded Service Lag

This example will illustrate that a bounded jitter between cells in a traffic flow does not imply the same bounded normalized service lead/lag for the traffic.

Figure 2:
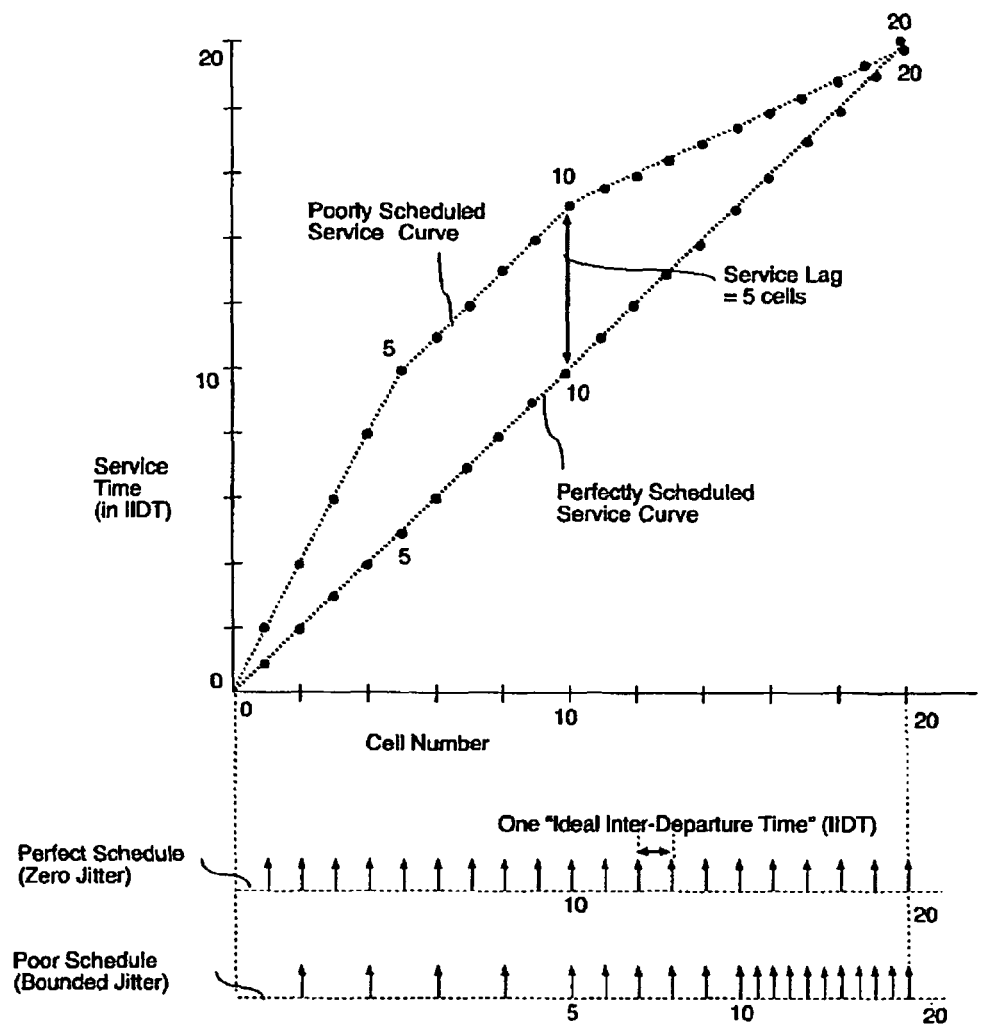
FIG. 2 illustrates an example of the service lead-lag.

Referring to FIG. 2, consider two traffic flows each with an average rate of 10 cells per 50 time-slots, so the IIDT(f)=5 time-slots between cell services on average. Let the maximum jitter be 5 time-slots, therefore the maximum time between the service of 2 cells<=10 time-slots. This example will illustrate that the service-lead-lag can be very large even though the jitter is bounded. The 2 traffic flows depart from their own queues, with a maximum jitter of 10 time-slots and the same average rate of 1/5 of the server capacity. The first traffic flow receives perfectly-spaced service, i.e., one packet departs every $5^{th}$ time-slot. The second traffic flow experiences large jitter for the first 5 cells, followed by perfectly-spaced service for the next 5 packets, followed by accelerated service for the last 10 packets.

For the second flow, let the service time of cells j=1 . . . 5 equal (j-1)*10+1, i.e., cells 1-5 receive service at time-slots 10, 20, 30, 40, 50, reflecting the fact that the jitter is bounded by 5 time-slots. Let the following 5 cells receive service with perfect IDT, i.e., cells 6-10 receive service at time-slots 55, 60, 65, 70, and 75, with zero jitter. Thereafter, the next 10 cells (cells 11-20) receive service with a spacing of 2.5 time-slots or (½) an IIDT. In both flows, 20 cells are served in 100 time-slots, i.e., two the flows have the same long-term average service rate. However, at time-slot 50 the first flow would have received service for exactly 10 cells, while the second flow has only received service for 5 cells. In this example, the second flow is 5 cells behind the ideal service schedule at time-slot 50. These 5 cells are stored in the queue, and the queue size is therefore at least 5 cells. The important point in this example is that a bounded jitter does not imply the same bounded service lead-lag. Therefore, a bounded jitter does not imply that the queues in the GPS or WFQ servers in FIG. 1 can be bounded by twice the jitter.

Achieving Fast Convergence of the GPS Algorithm

One difficulty of the regular GPS algorithm is that its departure schedule depends upon the initial values of the VFTs assigned to the traffic flows. Consider the specific problem of scheduling N traffic flows through the server, where each flow has a guaranteed traffic rate to be met. The scheduling frame has duration of F time-slots, and every flow f has a requested number of transmission opportunities, denoted rate(f), in the scheduling frame. To be admissible, the sum of all the requested rates by all traffic flows must be<=F. To compute a departure schedule for these N flows in a scheduling frame of duration F time-slots, one needs to assign the initial values of the VFTs for each flow. According to the regular GPS algorithm, if every flow has an empty queue initially, its initially VFT value is assigned when its first cell arrives. However, when computing a schedule for GR traffic in scheduling frame of duration F, the schedule should be independent of the arriving times of all the cells. Therefore, we can assume each flow has k cells in its queue initially, where k=rate(f), and we may assume that the initial VFT of every flow is 0.

The problem with this variation of the regular GPS algorithm is that the schedules are not valid until after the system has stabilized. In particular, over the first F time-slots the number of time-slots assigned to each flow may not equal the requested rate for that flow. One solution is to compute the schedule over larger intervals of time, i.e., to compute the schedule over multiple scheduling frames, i.e., over time-slots from 1 to J*F for some integer J. We may discard the first (J-1)*F entries in the schedule, and we keep the last F entries in a periodic schedule of length F. This schedule will usually be valid, i.e., every flow will be assigned a number of time-slots equal to its requested rate. However, the problem with this approach is its speed. In some applications F may be as large as 1024 time-slots or 4,096 timeslots. Therefore, one may compute the GPS iterative solutions repeatedly until the schedule stabilizes, which is undesirable.

A second problem is that the regular GPS schedule does not minimize the jitter. The GPS schedule does provide low-jitter, but it does not minimize the jitter. Furthermore, the schedule will be repeatedly periodically if the traffic flow rates remain constant. Therefore, the system will have larger queues than necessary.

We now present a variation of the GPS algorithm which can compute a departure schedule with lower jitter, which is guaranteed to be valid over time-slots 1 ... F. One only needs to compute the GPS iterative equations for F time-slots, from 1 to F, to compute a stable schedule.

FIG. 3a illustrates a method Schedule_GPS.

Line 200 calls the method with parameters F, N, the rate vector and the initial VFT values assigned to the flows. N is the number of flows and F is the length of the scheduling frame. Line 202 assigns the vector of flow IIDT's for be infinity for every flow. Line 204 assigns the initial vector of flow VFTs for be infinity for every flow. Lines 206-216 form a loop which initializes the IIDT and the VFT for every flow f. Line 208 tests is the flow rate is>0 time-slots. If true, the IIDT for the flow is assigned in line 210, and the initial VFT value for the flow is assigned in line 212. If a flow has no requested rate, its IIDT and its initial VFT remain at infinity.

Line 218 identifies the next cell number to be scheduled for every flow. Initially, the next cell to schedule for every flow is the first cell with cell number 1. Lines 220-234 form a loop which performs the proposed modified scheduling calculations for. F time-slots, from time-slot 'ts' varying from 1 up to F. Line 222 identifies the flow with the smallest VFT (which equals=minVFT); this flow has index 'fmin'. Line 224 tests to see if the minVFT is less or equal to the current time-slot, and if the next cell number to schedule for this flow is less than the requested rate for this flow. If true, in line 226 the traffic flow fmin is scheduled for service in this time-slot. If true, in line 228 the next cell number is incremented for this flow. If true, the VFT for this flow is updated in line 230. After the loop in lines 218-234 completes the iterations for F time-slots, the final schedule is returned in line 236.

FIG. 3b illustrates the method assign_first_VFT( ). Line 240 accepts the input parameters, including the value of the scheduling frame size F, the value of N, the vector of flow rates and the vector of flow IIDTs. Line 242 initializes the vector iVFT, denoting the initial VFTs, to be a vector of infinite values. Line 244 sorts the vector of flow rates into descending order. The vector of sorted rates is assigned to all_rates, and the vector of the flow indices is assigned to the vector all_flows. Line 246 assigns the time-slot ts to be 0. Lines 248-258 form a loop which computes the initial VFT value for every flow f. Line 250 identifies the next unprocessed flow in the sorted list; it has index 'flow'. Line 250 also identifies the traffic rate of the next unprocessed flow in the sorted list; it is stored in variable 'rate'. Line 252 tests to see if the requested rate is>0. If true, line 254 increments the time-slot counter, and line 256 assigns the initial VFT for the flow to the current value of the time-slot counter.

This method will assign all N traffic flows to have their first virtual finishing times in the range 0 up to N-1. Every flow will be assigned a unique first VFT. Flows with the higher rates will have initial VFTs which are lower than flows with lower rates, i.e., flows with higher rates precede flows with lower rates in this linear ordering. The results of this algorithm are presented in FIGS. 5 and 6 and will be discussed ahead.

The Proposed Schedule_MNLF Method

Consider an ideal GPS server 12 as shown in FIG. 1 At each round, the ideal GPS server selects the flow to service with the minimum VFT. Intuitively, this decision seems to be optimal. However, the decision is sub-optimal for the following reason.

When mapping the GPS server to the real WFQ server, selecting the flow with the minimum VFT as the next flow to service makes intuitive sense, as the selected flow would be the next to receive service by the GPS server if such an ideal system could be built. The real WFQ server services packets in the same order as the GPS server order. However, in the real WFQ server the act of transferring an indivisible cell or packet from the queue to the output link takes a finite amount of time which is proportional to the number of bits in the packet. During this time, no other packets can use the WFQ server or the output link. Effectively, the real WFQ server resolves the contention for the output link by serving packets in the same order as the GPS algorithm, but all eligible and unselected HOL packets wait at their queues for their opportunity for service. Therefore, in a heavily loaded WFQ server a backlog of eligible and unselected traffic flows which satisfy equation (9) will accumulate; these traffic flows all have VFTs less than or equal to the current time-slot and have not been served by the real WFQ server at the current time-slot. All of these traffic flows are eligible for service in any particular time-slot while their VFT is<=current time-slot, and the WFQ server selects the traffic flow with the minimum VFT for service.

A key observation is the following: the HOL packet with the minimum VFT does not have the maximum normalized service lag. Therefore, the existing GPS-WFQ algorithms do not minimize the normalized service lead-lag of the traffic flow selected for service. As a consequence of theorem 1 stated earlier, any the queue associated with the GPS-WFQ server will be larger than necessary.

A real-world example is the following. In an airport, consider a queue of passengers waiting to check their baggage and catch their flights. As the deadline for a flight approaches, passengers on that flight can usually preempt other passengers. The value of each minute of 'waiting time' for each passenger is different, depending upon how urgent the passenger's deadline is. The value of each minute spent waiting is much more important for a passenger with a deadline of 5 minutes, than for a passenger with a deadline of 1 hour. The GPS algorithm treats time equally for all backlogged traffic flows, by servicing backlogged flows according to the lowest VFT first. A better strategy is to treat traffic flows according to the lowest normalized service lead-lag. This strategy is often used at airports, where passengers who are about to miss their flight are usually given priority.

Consider a first example where a set of K flows have identical VFTs all satisfying equation (9) at time-slot t. Assume the GPS server selects one flow fmin for service at random from this set. By following the GPS service order, the real WFQ server will select the same flow fmin for service. However, given that several flows have the same minimum VFT, a better strategy is to select the flow f* with the maximum normalized service lag at that time-slot. This decision guarantees that the real WFQ multiplexer scheduler makes the best decision possible at the given time-slot, with respect to minimizing the normalized service lag. This decision will minimize the sizes of the associated queues.

The above case considered one example. The strategy of selecting a flow to service can be generalized as follows. Call this first scheduling algorithm the MNLF algorithm.

Every flow f with a non-zero guaranteed traffic rate is initially assigned a normalized service lag of −1. Every flow f is also assigned a Normalized Service Lag increment value, equal to 1/IIDT(f). A flow which does not request any guaranteed-rate traffic is assigned an initial normalized service lag of negative infinity, and an IIDT(f)=negative infinity. In each time-slot, the normalized service lag of every flow f is incremented by 1/IIDT(f). We observe that the normalized service lag increment for a flow depends upon the IIDT for the flow. Using this method, the value of each time-slot of waiting time for a flow is weighed, according to 1/IIDT(f). The value of each time-slot spent waiting is larger for traffic flows with higher traffic rates and smaller IIDTs.

In each time-slot t, the normalized service lag for every flow f is incremented by its IIDT(f), as follows:

$$nLAG(f)=nLAG(f)+1/IIDT(f) \quad (12)$$

In each time-slot t, a packet is identified for service as follows:

$$(nLAGmax, fmax)=max(nLAG(1:f)) \quad (13)$$

The nLAGmax is the largest current normalized service LAG of all flows which have queued packets. If there is at least one non-empty queue, the nLAGmax equals the largest normalized LAG, and fmax is the index of the flow with this nLAG value. If multiple flows have the same maximum nLAG value, the server may select one flow from that set either at random, or the flow with the minimum VFT, or any other criterion may be used.

The decision of which cell to service in a time-slot can be made as follows. The constant 'THRESHOLD' the smallest acceptable normalized service lag we are willing to accept, which can be for example −1 initially.

if (nLAGmax>THRESHOLD) & (flow has outstanding requests)

$$\begin{aligned}&f^* = fmax\\&\text{else}\\&\quad f^* = fmin \quad (14)\\&\text{end}\end{aligned}$$

The MNLF server services flow f* and updates its nLAG value by subtracting 1, reflecting the departure of 1 cell.

The service lag of a cell k of flow f at time t is defined as:

$$lag(k,f)=t-c*IIDT(f) \quad (15)$$

This equation 15 assumes that all flows start their time clocks at time-slot=0. The normalized service lag of a cell k of flow f at time-slot t is defined as:

$$lag(k,f)=(t-c*IIDT(f))/IIDT(f) \quad (16)$$

To implement this MNLF system, each queue/flow may have a memory to record the next cell number to schedule. The next cell number is an index between 1 and infinity since the virtual-time goes from 1 to infinity as discussed earlier.

For GR traffic flows with fixed sized-cells, the final MNLF algorithm can be expressed as follows. The extension to variable-size packets is a straight-forward modification of these equations.

When a packet k of flow f arrives at an empty queue, it is assigned a LAG value as follows, where R is the current time-slot:

$$LAG(k,f)=t-k*IIDT(f) \quad (17)$$

Assuming all flows are ready to transmit at time-slot=0. The ideal departure time of cell k for this flow is equal to k*IIDT (f) time-slots. The Lag for cell k of flow f at time-slot t is therefore given by t−k*IIDT(f).

When a cell k on traffic flow f arrives at a non-empty queue j, it is assigned the same LAG value as follows:

$$LAG(k,t)=t-k*IIDT(f) \quad (18)$$

In each time-slot, the lag values of all flows are incremented by 1 time-slot, since the time variable t is incremented by 1. The normalized LAG values are found by dividing the LAG of each flow f by its IIDT(f), i.e., $$nLAG(f)=LAG(f)/IIDT(f) \quad (19)$$

In each time-slot, the server selects the flow with the largest normalized service lag. When a flow is selected for service, its lag values are updated.

The Matlab notation developed by MathWorks will be used in the flow-charts. A vector of length N can be denoted V(1:N). Element j of the vector can be denoted V(j). Two vectors A and B of length N can be operated upon, i.e., V=A+B is equivalent to V(1:N)=A(1:N)+B(1:N). A complex loop will use indentation to identify the scope of the loop. A simple loop will use curly brackets { } to identify the scope of the loop.

FIG. 4 illustrates the method Schedule_MNLF( ). The method will schedule N guaranteed-rate traffic flows in a scheduling frame of duration F time-slots. In line 270 the method receives the parameters F, N and the rate vector for the N flows. Rate(f) is the number of time-slot reservations in the scheduling frame for flow f. Line 271 assigns the initial Schedule to be a vector of 0s, with length F. Line 272 initializes the vector of flow IIDTs to infinity. Line 273 initializes the vector of flow nLAG values to negative infinity. Lines 274-284 form a loop which initializes the IIDT and the normalized Lag values for every flow. In line 276, if the rate of the current flow is greater than 0, line 278 will assign the IIDT for the flow into the vector IIDT( ) and line 280 will assign an initial normalized LAG value of the flow to be −1. Line 286 initializes a vector 'cell' of length N to ones. Each element cell(f) equals the next cell number to be scheduled for flow f. Line 288 counts the total number of time-slot requests to be satisfied into the variable 'requests', by summing up the elements of the rate vector.

Lines 292-314 form the iterative calculations, for time-slots 1 up to F. For each time-slot, line 292 updates the normalized lag value for every flow j, by incrementing the normalized lag vector by 1/IIDT(j) for every flow j. Line 294 finds the flow with the largest normalized lag value. Line 294 assigns the variable maxnLAG to the maximum normalized lag value and variable fmax identifies the flow. Line 296 identifies the number of time-slots left in the scheduling frame, into the variable 'free'. Line 298 tests if the number of time-slot requests equals the number of time-slots remaining in the frame. If true, the variable 'forced' is set to 1, otherwise it is set to 0.

Lines 304-312 are executed if a flow is scheduled for service in the current time-slot. Lines 300 and 302 tests to see if either of 2 conditions are true. The first condition is true when the maximum normalized service lag is greater than some threshold value, and the next cell number to schedule for the flow is less than the requested rate for the flow. Typically, the threshold may be −1 or −0.5 or 0, and it indicates the most negative normalized service lead that we are willing to accept for any flow. The second condition is true if the variable 'forced'=1, which occurs when the number of time-slots requests left to be satisfied equals the number of time-slots remaining. If either condition is true, line 304 schedules the flow for service in this time-slot, line 306 updates the next cell number to schedule for the flow, line 308 updates the normalized lag value for the flow, and line 310 decrements the number of requests left to be satisfied. Line 314 ends the iterative loop for the F time-slots. Line 316 returns the schedule, a vector of F elements where each element identifies a flow to be serviced in a time-slot. A 0 element indicates that no flow is to be scheduled for that time-slot.

Iterative Solution of Equations

It is possible to iteratively solve the preceding equations as the time-slot variable t grows to infinity, for a system with fixed-sized packets (cells). The time-slot t keeps incrementing to infinity, and the equations are solved in each time-slot iteratively.

Reuse of Server Schedules for Guaranteed-Rate Traffic Flows

If the guaranteed rates of the traffic flows do not change from one scheduling frame to the next scheduling frame, and if fixed-sized packets are used, the server schedules computed for each scheduling frame will become periodic. Therefore, it is possible to store the server schedule computed in one scheduling frame and reuse it in the next scheduling frame. To perform the storage, every server may have an associated schedule look up table. When the schedule is periodic, a controller may enable the use of the schedule in the lookup table, and disable the use of dynamic computation of the schedule. Otherwise, the controller will allow the schedule to be computed dynamically by solving the preceding equations. This option has several attractive aspects for GR traffic flows. It will minimize the power expended in the server scheduler, since the schedule can be computed once and reused as long as the traffic flow rates remains unchanged. Furthermore, the use of a precomputed server schedule allows for the possibility where a control processor can download an alternative precomputed server schedule.

Determining Initialization for Guaranteed-Rate Scheduling

For variable-size packets, the GPS-WFQ equations are all conditional on the arrival times of new packets, i.e., the virtual finishing time assigned to a new packet depends upon the state of the queue and the number of bits in the new packet. When a new packet arrives to any empty queue, a new VFT is assigned to the packet based upon the current virtual time. R When the queues are continuously backlogged, all future events are affected by the initial value of the VFT of each packet arriving at an empty queue.

For Guaranteed-Rate traffic flows with fixed-sized cells, the schedule is periodic. The cell service times in a scheduling frame are determined in a deterministic manner, and are not influenced by the actual arrival time of packets. Therefore, methods can be employed to select the VFT for the first packet of every flow f, in a manner to minimize the jitter or service lag.

There are several approaches to select an initial VFT to minimize the service lag. The method Assign_First_VFTs in FIG. 3b is one preferred method.

FIG. 5 illustrates the computed server schedules for one example scheduling problem. Three schedules are computed, using the method Schedule_GPS where all VFTs are initially 0s, the proposed method Schedule_GPS using the method Assign_First_VFTs, and the proposed method Schedule_MNLF.

In the first example scheduling problem, there are N=4 traffic flows to be scheduled over a scheduling frame with F=16 time-slots. The vector of guaranteed traffic rates is (1,2,4,8). All 4 flows request a total of (1+2+4+8)=15 time-slots out of the scheduling frame of 16 time-slots.

Table 5.1 illustrates the results of the method Schedule_GPS, assuming an initial VFT=0 for every flow. The schedule is computed over 32 time-slots. The schedule is periodic and repeats after 16 time-slots, and the periodic schedule is:

Schedule=[1 2 3 4, 4 3 4 4, 2 3 4 4, 3 4 4 0]

Observe that the schedule has relatively poor jitter properties, i.e., the service to flow 4 occurs in clusters, rather than being evenly spaced. Furthermore, the jitter will never improve since the schedule is periodic. The jitter will remain relatively poor as long as the schedule remains unchanged.

Table 5.2 illustrates the results of the method Schedule_GPS, assuming the initial VFTs are computed using the method Assign_First_VFTs. The schedule is periodic and repeats after 16 time-slots, and the periodic schedule is:

Schedule=[4 3 2 4, 1 4 3 4, 4 2 3 4, 4 3 4 0]

Observe that the schedule has better jitter properties, i.e., the service to flow 4 is relatively evenly spaced. The assignment of the first VFTs using the method Assign_First_VFTs( ) has improved the jitter performance of the schedule.

Table 5.3 illustrates the results of the proposed method Schedule_MNLF. The schedule is periodic and repeats after 16 time-slots, and the periodic schedule is:

Schedule=[4 3 4 2, 4 3 4 1, 4 3 4 2, 4 3 4 0]

Observe that the schedule has excellent jitter properties, i.e., the service to flow 4 is perfectly evenly spaced.

Table 6 illustrates the performances of the same three methods for a second example, with N=4, F=16, and guaranteed traffic rates=[7, 3, 2, 1]. The 4 traffic flows request 13 time-slots out of 16, and there are 3 idle time-slots in this example.

Table 6.1 illustrates the results of the method Schedule_GPS, assuming an initial VFT=0 for every flow. The schedule is computed over 64 time-slots. The schedule is periodic and repeats after 32 time-slots, and the periodic schedule is:

Schedule = [1234, 4340, 2434, 0404][3124, 4340, 2434, 0404]

Observe that the schedule has relatively poor jitter properties, i.e., the service to flow 4 occurs in clusters, rather than being evenly spaced. Also, the length of the schedule is 2*F time-slots, which is unnecessarily long to compute and to store (if the schedule is to be stored). Furthermore, the jitter never improves with time since the schedule is periodic.

Table 6.2 illustrates the results of the method Schedule_GPS, assuming the initial VFTs are computed using the method Assign_First_VFTs. The schedule is computed over 64 time-slots. The schedule is periodic and repeats after 16 time-slots, and the periodic schedule is:

Schedule=[0 3 2 4, 1 4 3 4, 0 4 2 4, 3 4 0 4]

Observe that the schedule has better jitter properties, i.e., the service to flow 4 is relatively evenly spaced. The assignment of the first VFTs using the method Assign_First_VFTs( ) has improved the jitter performance of the schedule.

Table 6.3 illustrates the results of the proposed method Schedule_MNLF. The schedule is periodic and repeats every 16 time-slots. The periodic schedule is:

Schedule=[0 4 3 4, 2 4 0 1, 4 3 4 2, 4 3 4 0]

Observe that the schedule has excellent jitter properties, i.e. the service to flow 4 is nearly-perfectly spaced, and the length of the schedule is minimal, i.e., it has a length of F time-slots.

FIG. 7 illustrates 2 plots for the method Schedule_GPS and the method Assign_First_VFTs for a fully-loaded server with N=16 flows and F=1024 time-slots per scheduling frame. FIG. 6a illustrates the normalize service lead-lag. The x-axis specifies the cell number. The y-axis specifies the normalized service time for the cell. The ideal schedule will have a perfect diagonal line. The normalized service lead-lag curves for several hundred traffic flows where generated and plotted. The actual curves deviate slightly from the ideal curve. The curves above the diagonal represent normalized service lags, while the curves below the diagonal represent normalized service leads. Observe that the methods yield reasonably low jitter schedules.

FIG. 6b plots the probability distribution function (PDF) for the normalized service lead-lag. The x-axis specifies the normalized lead-lag, while the y-axis specifies the probability. The method Schedule_GPS, using the method Assign_First_VFTs, has a minimum lead of about −1 IIDT, and a maximum lag of nearly 2 IIDT. The spread in the normalized service lead-lag is about 3 IIDT. According to theorem 1 stated earlier, the maximum queue size will be about 12 cells, using these algorithms.

Figure 7A:
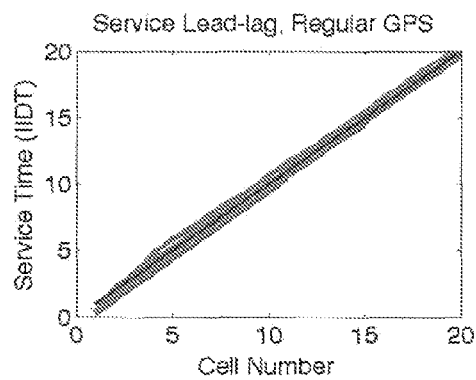
FIGS. 7A and 7B illustrate the normalized service lead-lag curves and the probability distribution function (PDF) of the normalized service lead-lag, for the method Schedule_GPS.
Figure 7B:
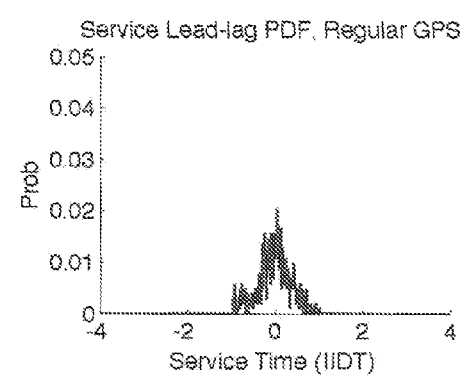
Figure 8A:
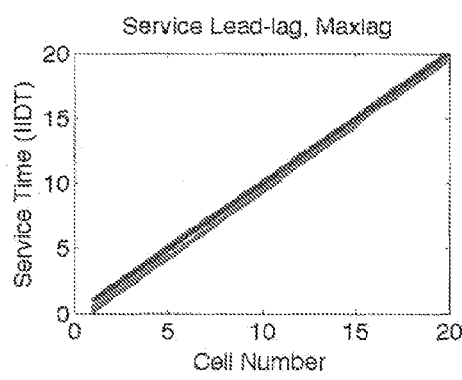
FIGS. 8A and 8B illustrates the normalized service lead-lag curves and the probability distribution function (PDF) of the normalized service lead-lag, for the method Schedule_MNLF.
Figure 8B:
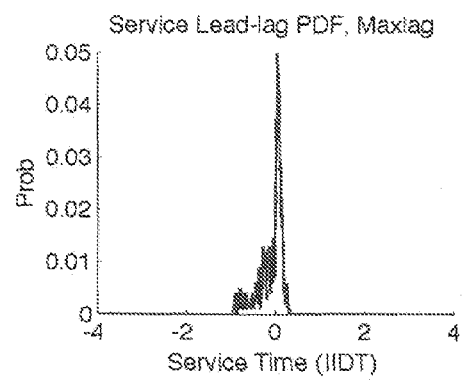

FIG. 7 illustrates 2 plots for the method Schedule_MNLF, for a fully-loaded server with N=16 flows and F=1024 time-slots. FIG. 7a illustrates the normalize service lead-lag. FIG. 7b plots the PDF for the normalized service lead-lag. The x-axis specifies the normalized lead-lag, while the y-axis specifies the probability. The MNLF method has a minimum lead of about −1 IIDT, and a maximum lag of slightly above 0 IIDT. The spread in the normalized service lead-lag is about 1.1 IIDT. According to theorem 1 stated earlier, the maximum queue size will be about 5 cells, using these algorithms. The MNLF method has reduced the spread in the normalized service lag significantly, which will reduce the sizes of the queues.

Use of Recursion to Compute Schedules

The preceding equations are iteratively solved to compute a server schedule. In many applications with GR traffic flows, the schedules are periodic and it is desirable to compute schedules very quickly. A computationally efficient recursive method is now proposed.

FIG. 9 illustrates a method Recursive_Schedule (V, Fc, RS, iVFT, Ts, Te).

This method breaks the current problem of scheduling a vector V of N guaranteed traffic rates to be met in a scheduling frame of length F time-slots, into two smaller scheduling sub-problems, to schedule two vectors of length N/2 into two scheduling frames of length F/2. In line 400 this function accepts these input parameters: V is the vector of guaranteed rates for N traffic flows with length N. Element V(j) is the number of time-slot reservations for flow j in the scheduling frame of length Fc. Variable Fc is the number of time-slots of the current scheduling frame. RS is a vector of length N. Element RS(j) is the real received service per flow j before the current scheduling problem. iVFT is the vector of the initial VFTs to be assigned to the packets in the current scheduling problem. It has length N and is measured in time-slots. Variables Ts and Te are the starting and ending time-slots for the current scheduling problem. Line 402 defines some globally visible data, including the number of traffic flows N, the initial F value denoted Fi before any recursive decomposition, the smallest F value denoted Fs when the recursion should stop, the IIDT vector, and the initial_VFTs at time 0, before any scheduling has happened.

Line 406 tests to see if the number of time-slots in the current scheduling problem size Fc exceeds the value Fs. If so, the scheduling problem will be subdivided into 2 smaller sub-problems. Line 408 assigns vector Va to the integer values of one half of vector V. The recursive scheduler is likely to have serviced at least this vector of time-slot requests in the first sub-problem (if the initial VFTs are sufficiently small). Line 408 assigns vector Vb the same values as vector Va. The recursive scheduler is likely to serve at least this vector of time-slot requests in the $2^{nd}$ sub-problem.

Line 412 assigns vector Vrem the values of 0s or 1s. Every flow f with an even number of requests (i.e., V(f) is even) is assigned a 0 in Vrem(f). Every flow f with an odd number of requests (i.e., V(f) is odd) is assigned a 1 in Vrem(f). Line 414 defines the start_time of the $2^{nd}$ scheduling sub-problem. Line 416 calls the method partition_ones( ). It is accept the vector Vrem and will return 2 vectors of length N, called Pa and Pb. Each vector has elements 0s or 1s, such that Pa+Pb=Vrem. A one in Vrem(j) represents a time-slot request for flow(j). These time-slots requests may be assigned into the first or second sub-problems. A one in Pa(j) indicates that one additional time-slot request for flow j will be assigned to the $1^{st}$ sub-problem. A one in Pb(j) indicates that one additional time-slot request for flow j will be assigned to the 2 ns sub-problem.

Line 418 assigns vector RSa the value of vector RS. RSa is the vector of received service per flow before the first scheduling sub-problem. Line 420 assigns vector iVFTa to the value of vector iVFT received from the calling program. The first scheduling sub-problem will use the initial VFTs provided in vector iVFTa. Line 421 assigns the start time and end time into variables Ts1 and Te1 for the $1^{st}$ sub-problem with F/2 time-slots.

Line 422 calls the same method Recursive_Schedule( ) to solve the first scheduling sub-problem. It returns a vector ScheduleA of length Fc, corresponding to the flows serviced in the Fc time-slots.

Line 424 assigns vector RSb the value of vector RS plus RSa. RSb is the vector of received service per flow before the second scheduling sub-problem. The recursive scheduler is guaranteed to have serviced these flows before the start of the $2^{nd}$ sub-problem.

Line 426 assigns vector iVFTb to the appropriate initial VFT values for each flow to be serviced in the $2^{nd}$ sub-problem. iVFTb(j) equals the initial VFT for flow j plus the product of the next cell number to schedule for flow j times the IIDT for flow j. Line 428 assigns the start time and end time for the $2^{nd}$ scheduling sub-problem of length F/2 time-slots.

Line 430 calls the same method Recursive_Schedule( ) to solve the second scheduling sub-problem. It returns a vector ScheduleB of length Fc corresponding to the flows serviced in the Fc time-slots.

Line 432 combines the schedules for the $1^{st}$ and $2^{nd}$ sub-problems to yield one schedule of length Fc, which will be returned by this function. Line 434 is the 'else' clause, invoked when Fc equals Fs. When this occurs, the recursion stops. Line 436 calls the method Schedule_Interval( ) to schedule all the requests in the current sub-problem of length Fs time-slots. Line 436 returns a schedule of length Fs, which is returned by this function.

FIG. 10 illustrates the method Schedule_Interval( ). On line 440 it accepts several input parameters. V is the vector of time-slot requests for all N flows, for the scheduling interval of length Fs time-slots. Variable Fc is the number of time-slots in the scheduling interval, which equal Fs. RS is the vector of received service per flow, prior to the start of this scheduling interval. iVFT is the vector of initial VFTs to be used in this scheduling interval. Variables Ts and Te are the start and end time-slots of the current scheduling sub-problem. This method calls a method Schedule_GPS if we are computing a GPS schedule recursively. In this case, it passes the initial VFT values provided in line 440 to the method Schedule_GPS. This method calls the method Schedule_MNLF if we are computing a MNLF schedule. It passes the received service vector RS on line 440 to the method Schedule_MNLF.

FIG. 11*a* illustrates the method partition_ones_GPS (Vrem). On line 480 it accepts several input parameters. Variable F is the length of the scheduling problem. Va and Vb are vectors representing time-slot request vectors to be scheduled in the $1^{st}$ or $2^{nd}$ scheduling sub-problems. The variable midtime is the start time of the second sub-problem. RS is the vector of received service at the start of the second sub-problem. Line 480 returns 2 vectors Pa and Pb, where Pa+Pb=Vrem. Line 482 identifies some globally visible data, where N is the number of flows, Rates is a vector of flow rates. IIDT is the vector of IIDTs and initVFT is the vector of initial VFTs defined at time=0. Lines 486 and 488 assign vectors Pa and Pb to be zeros. Lines 490-498 define a loop which computes the VFT of the next cell to schedule for each flow, at the start of the second sub-problem. Each VFT(j) equals the initial VFT for the flow j at time 0, plus the product of the next cell number to schedule for flow f in the second sub-problem times the IIDT for flow j. Line 500 sorts all VFTs in ascending order. Line 502 computes the number of free time-slots in the $1^{st}$ sub-problem. Line 504 computes the number of free time-slots in the 2nd sub-problem.

Lines 506-524 defines a loop which processes each flow f, and assigns any time-slot request for flow f in vector Vrem to either the $1^{st}$ or $2^{nd}$ scheduling sub-problem. Line 508 identifies the next unprocessed flow f. Line 510 tests to see if the flow index f is valid (f>0), if Vrem(f) equals 1, if the rate for the flow is >0, if the VFT for the flow is less or equal to the start time of the $2^{nd}$ sub-problem mid-time, and if the $1^{st}$ sub-problem can accommodate the time-slot request (free_a>0). If true, the time-slot request for this flow is assigned to the $1^{st}$ sub-problem, by assigning a 1 to Pa(f). If true, the variable free_a is decremented by 1 in line 514, as the $1^{st}$ sub-problem can now accommodate one fewer time-slot requests. Line 516 tests to see if the flow index f is valid (f>0), if Vrem(f) equals 1, if the rate for the flow is >0, if the VFT for the flow is greater or equal to the start time of the $2^{nd}$ sub-problem mid-time, and if the $2^{nd}$ sub-problem can accommodate the time-slot request (free_b>0). If true, the time-slot request for this flow is assigned to the $2^{nd}$ sub-problem, by assigning a 1 to Pb(f). If true, the variable free_b is decremented by 1 in line 520, as the $2^{nd}$ sub-problem can now accommodate one fewer time-slot requests.

Method Partition_Ones_MNLF

FIG. 11*b* illustrates the method partition_ones_MNLF (Vrem) for the MNLF scheduler. Line 500 sorts all Normalized Service Lags in descending order. Line 502 computes the number of free time-slots in the $1^{st}$ sub-problem. Line 504 computes the number of free time-slots in the 2nd sub-problem.

Lines 506-524 defines a loop which processes each flow f, and assigns any time-slot request for flow f in vector Vrem to either the $1^{st}$ or $2^{nd}$ scheduling sub-problem. Line 508 identifies the next unprocessed flow f. Line 510 tests to see if the flow index f is valid (f>0), if Vrem(f) equals 1, if the rate for the flow is >0, if the normalized service lag for the flow is positive at the start time of the $2^{nd}$ sub-problem mid-time, and if the $1^{st}$ sub-problem can accommodate the time-slot request (free_a>0). If true, the time-slot request for this flow is assigned to the $1^{st}$ sub-problem, by assigning a 1 to Pa(f). If true, the variable free_a is decremented by 1 in line 514, as the $1^{st}$ sub-problem can now accommodate one fewer time-slot requests. Line 516 tests to see if the flow index f is valid (f>0), if Vrem(f) equals 1, if the rate for the flow is >0, if the normalized service lag for the flow is negative at the start time of the $2^{nd}$ sub-problem mid-time, and if the $2^{nd}$ sub-problem can accommodate the time-slot request (free_b>0). If true, the time-slot request for this flow is assigned to the $2^{nd}$ sub-problem, by assigning a 1 to Pb(f). If true, the variable free_b is decremented by 1 in line 520, as the $2^{nd}$ sub-problem can now accommodate one fewer time-slot requests.

Results of Recursive Scheduling

The recursive scheduling methods were thoroughly tested, and they agree completely with the non-recursive iterative methods. The results for one sample scheduling problem are shown. The scheduling problem has N=4 flows, with rates [5, 7, 9, 11], in a scheduling frame of length F=32 time-slots. The recursive partitioning terminates when the sub-problem size is F_small=8 time-slots.

The vector [5, 7, 9, 11] is partitioned into vectors [2, 3, 5, 6] and [3, 4, 4, 5]. These are recursively partitioned into vectors [1, 2, 2, 3], [1, 1, 3 , 3], and [2, 2, 2, 2] and [1, 2, 2, 3], which are then scheduled. Here is the final schedule for the recursive GPS methods:

4 3 2 4, 1 3 4 2
3 4 1 2, 4 3 4 3
2 1 4 3, 2 4 1 3
4 2 3 4, 1 4 2 3

For comparison, here is the final schedule for the non-recursive method Schedule_GPS (using method Assign_First_Ones):

4 3 2 4, 1 3 4 2
3 4 1 2, 4 3 4 3
2 1 4 3, 2 4 1 3
4 2 3 4, 1 4 2 3

The results are identical.

The MNLF algorithm was tested for a problem with N=4, F=32, and the rate vector [2, 4, 8, 16]. The vector was partitioned into 2 vectors [1, 2, 4, 8] and [1, 2, 4, 8], which were recursively split into vectors [0, 1, 2, 4], [1, 1, 2, 4], and [0, 1, 2, 4], [1, 1, 2, 4]. Here is the final schedule for the recursive MNLF methods:

4 3 4 2, 4 3 4 0
4 3 4 1, 2 4 3 4
4 3 4 2, 4 3 4 0
4 3 4 1, 2 4 3 4

For comparison purposes, the results of the GPS algorithm, using the method Assign_First_VFTs are:

4 3 2 4, 1 4 3 4
4 3 2 4, 4 3 4 0
4 3 2 4, 1 4 3 4
4 3 2 4, 4 3 4 0

For comparison purposes, the results for the GPS algorithm, where the initial VFTs are 0s, are:

1 2 3 4, 4 3 2 4
1 3 4 2, 3 4 1 2
3 4 4 3, 2 1 4 3
2 4 3 1, 4 2 3 0

Applications to an Input-Queued Switch

Input Queued crossbar switches are described in the paper by T. H. Szymanski, "*Bounds on the End-to-End Delay and Jitter in Input-Buffered and Internally Buffered IP Networks*", which was incorporated by reference earlier.

Figures 12A, 12B:
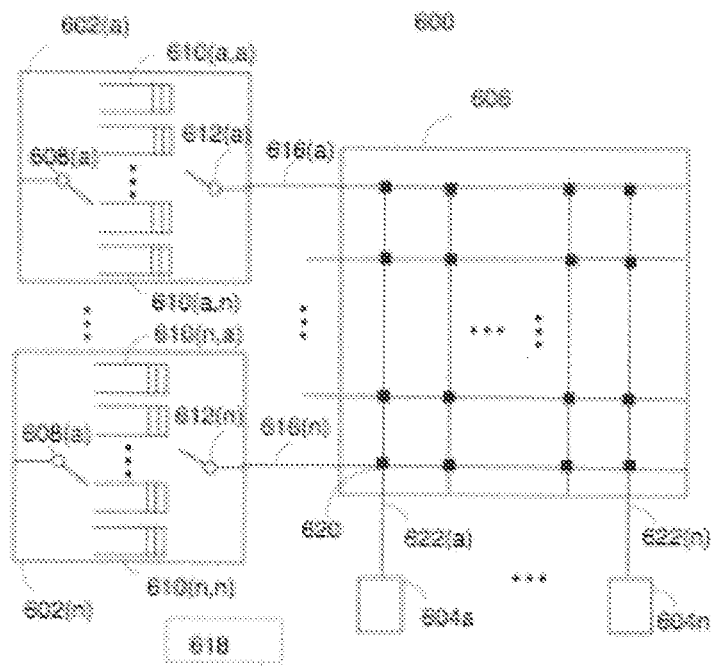
FIGS. 12A and 12B illustrate an N×N Input Queued crossbar switch.

An N×N Input-Queued (IQ) crossbar switch 600 is shown in FIG. 12*a*. It consists of N input port modules labeled 602(*a*), . . . , 602(*n*), N output port modules labeled 604(*a*), . . . , 604(*n*), and an N×N switching matrix 606. Each input port module 602(*a*) contains N Virtual Output Queues labeled 610. Each VOQ 610 is associated with one input port 602 and one output port 604. The notation VOQ 610(*a,b*) will refer to a specific VOQ 610 within input port 602(*a*), which is associated with output port 604(*b*). Each VOQ 610(*a,b*) stores cells or packets which arrive at input port 602(*a*) and which are destined for output port 604(*b*). Variable-size IP packets typically arrive at each input port 602. IP packets typically have a maximum size of 1500 bytes. These variable-size packets are typically segmented into fixed-sized packets called cells, which are forwarded to the appropriate VOQ 610 by a multiplexer 608, based upon a destination tag in the packet header.

Each input port 602(*a*) has a VOQ-server 612(*a*). In each time-slot, a VOQ-server 612(*a*) may select one VOQ 610(*a,\**) for service, where the '\*' denotes any label from (a) to (n). If a VOQ 610(*a,\**) is selected for service, the associated VOQ-server 612(*a*) will remove one packet from the VOQ 610(*a,\**) and transmit the packet onto the outgoing transmission line 616(*a*) to the switching matrix 606.

The switching matrix 606 has a programmable switch (not shown) at each of the N-squared crosspoints 620. The programmable switch at crosspoint 620(*a,b*) can connect the row transmission line 616(*a*) with the column transmission line 622(*b*), thereby establishing a connection between input port 602(*a*) and output port 604(*b*). In practice, the switching matrix 606 can include other topologies to provide connectivity between input ports and output ports, rather than rows and columns.

A centralized control unit 618 is typically used to control the input ports 602, the output ports 604, the VOQ-servers 612 and the switching matrix 606. In each time-slot, the centralized control unit 618 matches a set of M input ports 602 to a set of M distinct output ports 604 for service, where M<=N. In an IQ switch 600, the input and output ports selected for service in one time-slot obeys two constraints: (1) each input port is connected to at most one output port by the switching matrix 606, and (2) each output port is connected to at most one input port by the switching matrix 606. For each input port 602 selected for service, the controller 618 controls the VOQ-server 612 to select the appropriate VOQ 610 for service, where the appropriate VOQ contains the packets associated with the appropriate output port. The centralized control unit 618 controls the input ports, output ports, the VOQ servers and the switching matrix using control signals (not shown).

The long term traffic rates between the N input ports 602 and the N output ports 604 can be expressed in an N×N traffic rate matrix T, as shown in FIG. 12*b*. There are N-squared entries in the matrix T. The matrix T represents the number of requested time-slot reservations between every input port 602 and output port 604. For example, the matrix element T(a,b) contains the number of time-slot reservations requested between input port 602(*a*) and output port 604(*b*) in a scheduling frame with F=1024 time-slots. Since all traffic flowing between input port 602(*a*) and output port 604(*b*) passes through VOQ 610(*a,b*), therefore each matrix element T(a,b) contains the number of time-slot reservations for VOQ 610 (*a,b*) in a scheduling frame with F=1024 time-slots.

A switch may support multiple traffic classes, such as Guaranteed-Rate (GR) traffic flows, and Best-Effort (BE) traffic flows. The GR traffic flows request high Quality of Service (QoS) guarantees such as low end-to-end delay and jitter, while Best-Effort traffic flows request best-effort service with no QoS guarantees (or weak QoS guarantees). To support multiple traffic classes, the switch may maintain multiple traffic rate matrices, with each traffic rate matrix specifying the traffic capacity allocated between each pair of input and output ports, for each traffic class.

Scheduling an IQ switch to achieve 100% capacity is a difficult integer programming problem in combinatorial mathematics. One algorithm to schedule an IQ switch according to a traffic rate matrix T to achieve 100% capacity, without requiring any speedup of the switching matrix 606, while also guaranteeing a low jitter and a small and bounded normalized service lead/lag for all the traffic flowing between any pair of input ports and output ports, is described in the 2007 U.S. patent application Ser. No. 11/802,937 by T. H. Szymanski, entitled "A Method and Apparatus to Schedule Packets Through a Crossbar Switch with Delay Guarantees", which is incorporated by reference. This algorithm can be used by the controller 618. The controller 618 will process the matrix T and identify the sets of input ports 602 to be matched to output ports 604 in each time-slot, such that the N-squared traffic rates specified in the matrix T are satisfied within F time-slots.

Scheduling Multiple Traffic Flows within One VOQ

In an Internet router using an IQ switch 600, there may be hundreds or thousands of traffic flows which share any one VOQ 610. When a VOQ 610 is selected for service, one of these hundreds or thousands of traffic flows are selected for service, representing a significant scheduling problem.

FIG. 13*a* illustrates an input port 602(*a*) in more detail. Input port 602(*a*) comprises the demultiplexer 608(*a*), the N VOQs 610(*a,a*), ..., 610(*a,n*), and the VOQ-server 612(*a*). Each VOQ 610(*a,\**) comprises several components. To avoid the use of too many labels, the components comprising VOQ 610(*a,\**) will be labeled with a minimum number of labels. Each VOQ 610(*a,\**) comprises several components, including a demultiplexer 634, a set of numerous flow-VOQs 632, and a flow-server 630. Each traffic flow associated with a VOQ 610(*a,\**) has its own logical flow-VOQ 632, which stores the packets associated with the traffic flow. If one thousand traffic flows are associated with one VOQ 610(*a,\**), then the VOQ will have one thousand flow-VOQs 632. The flow-VOQs 632 are a logical abstraction, as a real VOQ may have one large physical memory unit to store all the packets associated with the VOQ, and a separate controller may keep track of the packets associated with each traffic flow through pointers to memory locations.

Figure 13:
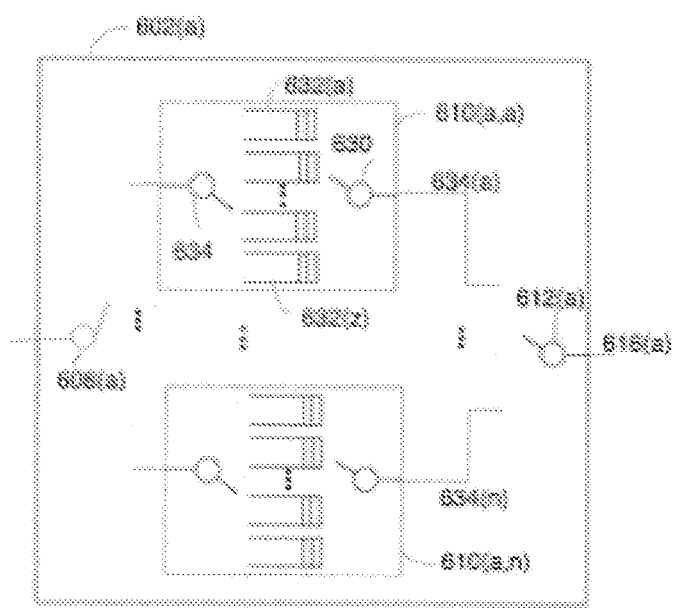
FIG. 13 illustrates an Input Port of a crossbar switch, with a 2-layer hierarchy of multiplexer-servers.

When a packet arrives at an input port 602(*a*), it is forwarded to the appropriate VOQ 610(*a,\**) by the demultiplexer 608(*a*). When a packet arrives at a VOQ 610(*a,\**), it is forwarded to the appropriate flow-VOQ 632 by a demultiplexer 634, as shown in FIG. 13.

In each time slot, the centralized controller 618 selects up to N input ports 602 for service, as described earlier. For each input port 602 selected for service in a time-slot, the controller 618 selects the appropriate VOQ 610 for service. The controller 618 identifies the VOQ 610 for service, but it does not select the traffic flow within the VOQ 610 for service. The method in which traffic flows are selected for service within one VOQ 610 will affect the queue sizes in each flow-VOQ 632 and in each VOQ 610, and can have a significant affect on the end-to-end network delay, jitter and performance.

Referring to FIG. 12*a*, it is possible that thousands of traffic flows share one VOQ 610 in a backbone router using the IQ switch 600. In FIG. 13*a*, each VOQ 610 is served by a VOQ-server 612. Whenever a VOQ 610 is selected for service in a time-slot, there are potentially thousands of flow-VOQs 632 which are candidates for service. In FIG. 13*a*, when the VOQ-server 612 selects a VOQ 610 for service, the associated flow-server 630 will be enabled to select one flow-VOQ 632 for service. When one flow-VOQ 632 is selected for service, the flow-server 630 removes one packet from the flow-VOQ, and forwards the packet to the VOQ-server 612, which forwards the packet to the outgoing transmission line 616.

The flow-server 630 is an example of a 'gated-server'. A gated-server is enabled for service by a control signal (not shown). Otherwise, the gated-server remains idle. Gated-servers are described in a section of the textbook by D. Bertsekas and R. Gallager, 'Data Networks", 2nd edition, Prentice Hall, 1992, which is hereby incorporated by reference.

This section describes a method to select a flow-VOQ 632 for service within a VOQ 610, when the VOQ 610 is selected for service. The method applies to any number of traffic flows which share one VOQ 610, for example 2 flows or 2 million flows can share one VOQ 610. The method also works for aggregated traffic flows. An aggregated traffic flow consists of the aggregation of any number of individual traffic flows, which share the same destination in the network.

Each gated flow-server 630 can use the method Schedule_GPS with appropriate modifications. The flow-server 630 controls access to an outgoing transmission line 634. The weight of each flow-VOQ 632 expresses the capacity of the outgoing transmission line 634 controlled by the flow-server 630. Therefore, the weight of each flow-VOQ 632 may be computed, expressed as a fraction of the capacity of the outgoing transmission line 634. The capacity of link 634 depends upon the bandwidth requested by the VOQ 610 in the traffic rate matrix. Therefore, the weights of the flow-VOQs 632 may be recomputed every time the traffic rate matrix changes. Once these weights are computed, the method Schedule_GSP can be used, with one other modification. The processing loop in lines 220-234 of the method Schedule_GSP is only processed for the time-slots 'ts' when the flow-server 630 is enabled for service. When the flow-server 630 is enabled for service, the time-slot counter 'ts' is incremented to the current time-slot between 1 and F. The flow-server 630 updates the VFT values for every traffic-flow in each enabled time-slot, as described in the method Schedule_GPS. Therefore, in each time-slot a gated flow-server 630 is enabled, it selects one flow-VOQ 632 for service. A gated flow-server 630 is enabled if it has been selected for service by the associated VOQ-server 612. This change ensures that a gated flow-server 630 only allocates service that it has received from the VOQ-server 612.

Each gated flow-server 630 can also use the method Schedule_MNLF with appropriate modifications, to achieve a schedule with lower jitter. The flow-server 630 controls access to an outgoing transmission line 634. The weight of each flow-VOQ 632 expresses the capacity of the outgoing transmission line 634 requested by the flow-VOQ, as stated earlier. Therefore, the weight of each flow-VOQ 632 may be computed, expressed as a fraction of the capacity of the outgoing transmission line 634, which is specified in the traffic rate matrix. Once these weights are computed, the method Schedule_MNLF can be used, with other modifications. The processing loop in lines 290-314 of the method Schedule_MNLF is only processed for the time-slots 'ts' when the flow-server 630 is enabled for service. When the processing loop is activated, the time-slot counter 'ts' assumes the value of the current time-slot, between 1 and F. The flow-server 630 updates the nLAG values for every traffic-flow in each time-slot in which it is enabled in line 292; This line is modified to reflect the fact that multiple time-slots may have expired since the last activation of the processing loop. Therefore, in each time-slot a gated flow-server 630 is enabled, it selects one flow-VOQ 632 for service. A gated flow-server 630 is enabled if it has been selected for service by the associated VOQ-server 612. This change ensures that a gated flow-server 630 only allocates service that it has received from the VOQ-server 612.

This use of a 2-level hierarchy of GPS or MNLF servers can be used to provide controlled access to the outgoing transmission link 616 by any number of traffic flows associated with each VOQ 610. The use of a 2-level hierarchy of servers can also be used to provide service for multiple traffic flows in traffic classes, for example Guaranteed-Rate traffic flows and Best-Effort traffic flows. The N×N Input Queued switch shown in FIG. 12 has N VOQs 610 associated with each input port 602. Each VOQ is associated with one pair of input and output ports and with one traffic class, i.e., all the traffic flows within a VOQ have the same traffic class and compete with each other for service. If the switch in FIG. 12 is configured to support 2 traffic classes, then some hardware modifications are required to each input port 602. Within each input port 602, each traffic class can have its own VOQ 610, which can be denoted the GR-VOQ for Guaranteed-rate traffic flows, and the BE_VOQ for Best-Effort traffic flows (not shown in FIG. 12) The GR-VOQs 610 receive preferential service to the outgoing transmission links 616. If a transmission link 616 remains idle in a time-slot, then the BE-VOQ 610 associated with the transmission link is enabled for service, and it may select a Best-Effort traffic flow for service. The BE_VOQ 610 will require a gated VOQ-server 612, which is enabled for service if the associated GR_VOQ 610 does not utilize the outgoing link 616. Any number of prioritized traffic classes can be supported.

Lookup Tables for Periodic Schedules

For Guaranteed-Rate traffic flows with fixed-sized packets, the schedules computed for the VOQ-servers 612 will be periodic. Therefore, the schedules for the VOQ-servers 612 can be computed once when the traffic rate matrix T changes, and can be stored in an appropriate lookup-table. Each VOQ-server 612 may have an associated lookup-table with F entries (not shown in any figure). The lookup-table identifies each VOQ 610 selected for service in each time-slot of a periodic scheduling frame. For a given time-slot, if the lookup-table entry is non-zero, then the VOQ 610 is identified for service. If the lookup-table entry equals 0, then the VOQ-server remains idle for that time-slot.

For Guaranteed-Rate traffic flows with fixed-sized packets, the schedules computed for the flow-servers 630 will also be periodic. Therefore, the schedules for the flow-servers 630 can be computed once when the traffic rate matrix T changes, and stored in an appropriate lookup-table (not shown in any figures). Each flow-server 630 may have an associated lookup-table with F entries. The lookup-table identifies each flow-VOQ 632 selected for service in each time-slot of a periodic scheduling frame. For a given time-slot, if the lookup-table entry is non-zero, then the flow-VOQ 632 is identified for service. If the lookup-table entry equals 0, then the flow-server remains idle for that time-slot.

Application to an Internally Buffered Crossbar Switch

Internally buffered crossbar switches are described in the paper by T. H. Szymanski, "*Bounds on the End-to-End Delay and Jitter in Input-Buffered and Internally Buffered IP Networks*", which was incorporated by reference earlier.

FIG. 12*a* can also describe an N×N internally buffered crossbar switch, with N input ports 602(*a*), . . . , 602(*n*), with N output ports 604(*a*), . . . , 604(*n*), and with a switching matrix 606. In an internally buffered crossbar switch 600, each crosspoint 620(*a,b*) contains a crosspoint queue (not shown) which can store packets. Therefore, each VOQ 610 (*a,b*) is associated with one crosspoint queue at 620(*a,b*).

The long term traffic rates between the N input ports 602 and the N output ports 604 can be expressed in an N×N traffic rate matrix T, as shown in FIG. 12b. For example, the matrix element T(a,b) contains the number of time-slot reservations requested between input port 602(a) and output port 604(b) in a scheduling frame with F=1024 time-slots. Since all traffic flowing between input port 602(a) and output port 604(b) passes through VOQ 610(a,b), therefore each matrix element T(a,b) contains the number of time-slot reservations for VOQ 610(a,b) in a scheduling frame with F=1024 time-slots.

The existence of crosspoint queues 620 in the switching matrix 600 simplifies the scheduling of traffic through the switch 606. Each VOQ 610(a,b) has an associated crosspoint queue 620(a,b). Therefore, each input port 602 can schedule its VOQ-server 612 independently of the other input ports. In each time-slot at each input port 602, the VOQ-server 612 may serve any non-empty VOQ 610 for service. For Guaranteed-Rate traffic, to achieve a moderate amount of jitter the VOQ-server 612 can be scheduled using the method Schedule_GPS described earlier. For Guaranteed-Rate traffic, to achieve very low jitter the VOQ-server 612 can be scheduled using the method Schedule_MLF described earlier. When a VOQ-server 612(a) selects a VOQ 610(a,b) for service, it removes one packet from the VOQ 610(a,b) and forwards the packet over the transmission line 616 to the crosspoint queue 620(a,b) within the switching matrix 606. The input ports 602 for an internally buffered crossbar switch can also support multiple traffic classes, as described earlier.

In an internally buffered crossbar switch, the switching matrix 600 has an internal column-server (not shown) associated with each column transmission line 622(a), . . . , 622(n). In each time-slot, the internal column-server associated with a column transmission line 622(a) selects one non-empty crosspoint queue 620 in the column for service. When a crosspoint queue 620(a,b) is selected for service, the column-server removes one packet from the crosspoint queue 620(a,b), and forwards the packet over the outgoing vertical transmission line 622(b) to the associated output port 604(b).

We have simulated the performance of the internally buffered crossbar switch using the GPS-WFQ scheduling algorithms, assuming GR traffic flows with fixed-sized cells. For a 64×64 buffered crossbar switch operating at 100% load, 100 fully-saturated traffic rate matrices of size 64×64 where generated. FIG. 12b illustrates a typical traffic rate matrix for a 8×8 switch, for a scheduling frame with F=1024 time-slots. The 64×64 matrices are much larger. The method Schedule_GPS was used to compute a schedule for every VOQ-server 612. Each row(a) of the matrix T represents the vector of N traffic rates requested by the N VOQs associated with input port 602(a). The vector of traffic rates in row(a) can be used to schedule the VOQ-server 612(a), using the method Schedule_GPS. Similarly, each column(b) of the matrix T represents the vector of N traffic rates requested by the N VOQs associated with output port 604(b). The vector of traffic rates in column(b) can be used to schedule the column-server in column (b) within the switching matrix 600, using the method Schedule_GPS.

All 100 matrices where processed and scheduled. The buffered crossbar switch was simulated to observe the maximum crosspoint queue sizes. Using the method Schedule_GPS, for a fully-loaded 64×64 crossbar switch the maximum crosspoint queue size is observed to be 6 cells, for our traffic matrices.

The method Schedule_MNLF can also be used to schedule each VOQ-server 612 and each column-server in column(b). Using the method Schedule_MNLF, for a fully-loaded 64×64 crossbar switch the maximum crosspoint queue size is observed to be 4 cells. Given that there are N-squared=64*64=4K crosspoint queues 620 in the switching matrix 600, the reduction in size from 6 cells to 4 cells per crosspoint queue 620 is quite significant.

Dynamic Scheduling for the Column Serves

This section describes alternative scheduling algorithms for the columns of the internally buffered crossbar switches. Each column server in column(b) of the switching matrix 600 can use several different algorithms to select a crosspoint queue 620 in column(b) for service. For example, the column server may select the Oldest-Cell-First. In this case, in each time-slot the column server selects the crosspoint queue 620 with the oldest cell in the column. Our experiments indicate that this algorithm tends to result in smaller sizes of crosspoint queues 620.

Achieving Near-Minimal Queue Sizes in a Network

According to theorem 1 stated earlier, the size of any queue will remain small and bounded to 4K cells, if two conditions can be met: (1) the traffic arriving to the queue has a bounded normalized service lead/lag (NSLL) of K cells, and (2) the service schedule for the queue has a bounded NSLL of K cells. The second condition ensures that the traffic departing any queue also have a bounded NSLL of K cells.

Figure 14:
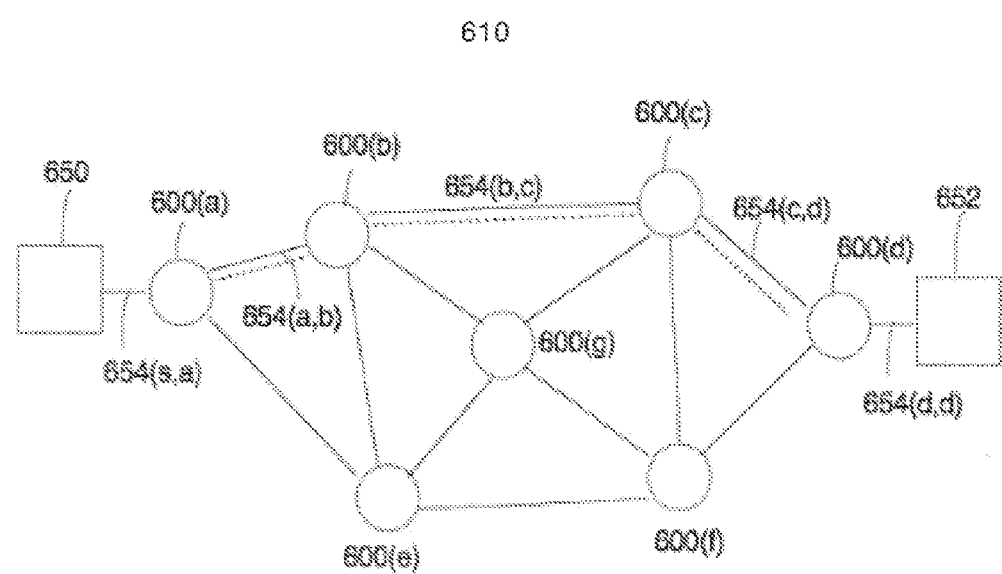
FIG. 14 illustrates a packet-switched network, using crossbar switches.

Consider a network of packet-switched routers 610 as shown in FIG. 14. The network comprises routers 600(a), . . . , 600(f). The routers may use an IQ switch or an internally buffered switch, both of which are described using the switch 600 in FIG. 12a. The network comprises a traffic source 650, a traffic destination 652, and many transmission links 654 between routers 600. In a backbone network, the traffic source 650 may have several thousand distinct traffic flows to be delivered at the traffic destination 652. The network may support any number of traffic classes. For this discussion, we assume all traffic flows belong to the Guaranteed-Rate traffic class, which requests near-minimal queue seizes and delays within each router.

To achieve a bounded NSLL for every traffic flow arriving at the router 600(a) in the network 610, every traffic flow should be processed at the traffic source 650, to have a bounded NSLL before the traffic flow is injected into the network over transmission line 654(s,a). A traffic flow can be processed at a traffic source 650 to have a bounded NSLL using the method Schedule_GPS or the method Schedule_MNLF. For example, the source 650 may have a multiplexer-server 12 as shown in FIG. 1, controlling access to the outgoing transmission line 654(s,a) in the network 610. Each traffic flow at the source 650 has an associated queue 10, as shown in FIG. 1. The multiplexer-server 12 can be configured to use fixed-size or variable-size packets. If fixed-sized packets are used, the packet size of the server may be selected at 1500 bytes, to retain compatibility with the current Internet typical packet size. To achieve a moderate jitter and a bounded NSLL on the traffic leaving the source 650, the server 12 can use the method Schedule_GPS.

To achieve a lower jitter and a lower bounded NSLL on the traffic leaving the source 650, the server 12 can use the method Schedule_MNLF. These methods will ensure that new traffic flows entering the network 610 have a bounded NSLL.

Referring to FIG. 14, when the traffic flows arriving to the network 610 have bounded NSLL, then the traffic arriving at router 600(a) will have a bounded NSLL. If router 600(a) uses the proposed methods to schedule the thousands of traffic flows through its VOQs 610, all traffic flows departing router 600(a) will also have a bounded NSLL. Every VOQ 610 in router 600(a) will therefore have a small and bounded size, and the delay of a packet passing through router 600(a)

will be small and bounded. The traffic arriving at routers 600(b), 600(c) and 600(d) will share the same properties. Every VOQ 610 in routers 600(b), ..., 600(d) will therefore have a small and bounded size, and the delay of a packet passing through these router 600(a), ..., 600(d) will be small and bounded. Therefore, the end-to-end delay for each of the thousands of traffic flows passing through the network 610 will be near-minimal.

To illustrate the methods, a computer simulation of a saturated network was performed. These results are presented in the paper by T. H. Szymanski, "*Bounds on the End-to-End Delay and Jitter in Input-Buffered and Internally Buffered IP Networks*", which was incorporated by reference earlier.

Figure 15A:
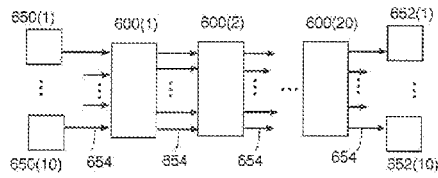
FIGS. 15A to 15F illustrate experimental results for the transmission of multiple traffic flows through a packet-switched network.

Referring to FIG. 15a, twenty routers 600 of size 10×10 were arranged in a linear array. There are 10 input links 654 entering the network, and 10 output links 654 leaving the network. There are 10 traffic sources 650 at the input side, and there are 10 traffic destinations 652 at the output side. Each traffic source generated on average 34.2 traffic flows, for transmission over one link 654 into the first router 600(1). Every link was saturated, with an average load of 100%. In this discussion, all traffic flows are Guaranteed-Rate traffic flows.

At each router 600(1), 342 traffic flows arrive on all 10 input links and all 342 traffic flows exit on 10 output links. Each traffic flow has a guaranteed traffic rate. All 10 links 654 leaving each of the 20 routers 600 are 100% loaded, and each link supports on average 34.2 traffic flows. This model represents 100% loading, an extremal point in the capacity region for this network, while operating at unity speedup. Hundreds of other network models were developed and simulated with different topologies, larger switches, and longer path lengths and all yielded essentially identical results.

Figure 15B:
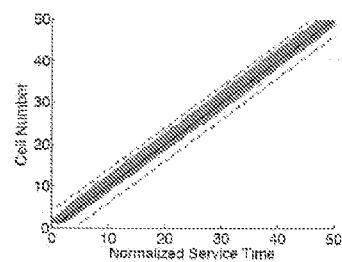

FIG. 15B illustrates the observed normalized service lead/lag curves for all 342 flows in all 20 routers. There are 342*20=6,840 curves plotted in FIG. 15B. The ideal normalized service curve is the solid 45-degree diagonal. The dashed lines correspond to maximum and minimum normalized service lag. The X-axis denotes the cell arrival time, expressed in terms of the IIDT for every flow f. The Y-axis denotes the cell number. The service curves for individual flows are indistinguishable due to the large number (6,840) of curves plotted on the same graph. However, all normalized service curves are observed to fall within the lower and upper envelopes of +/−4 IIDT. Every traffic flow receives very low jitter service, with a very small and bounded normalized service lead/lag.

Figure 15C:
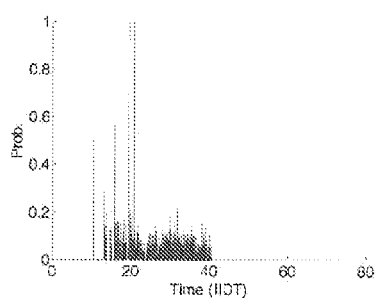
Figure 15D:
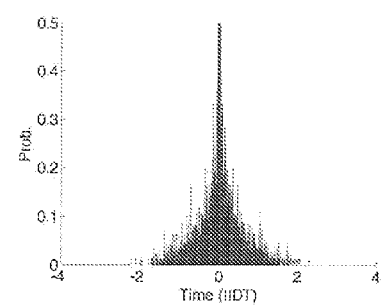
Figure 15E:
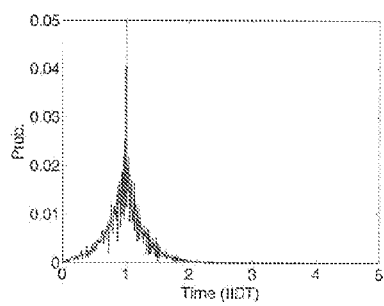
Figure 15F:
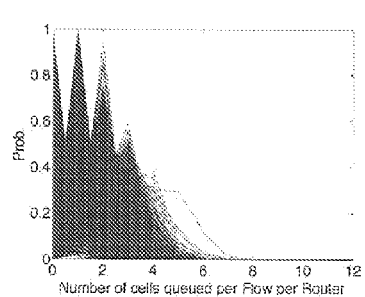

FIG. 15C plots the end-to-end (E2E) normalized delay PDF. All 342 flows have E2E normalized delays between 8 and 40 IIDT. FIG. 15D plots the E2E normalized delay jitter for each flow from its mean value. The E2E normalized delay jitter is at most 2 IIDT. FIG. 15E plots one cumulative probability distribution function for the Inter-Departure-Time (IDT) of packets in a traffic flow, with 6,840 curves representing all 342 flows in all of the 20 switches. Every cell in every flow waits on average 1 IIDT for service, i.e., one perfect IDT, with a minimum wait of nearly 0 IIDT and a maximum wait of 2 IIDT for service. FIG. 15F plots the number of queued cells per traffic flow per router 600, equivalently the number of cells the flow-VOQs in any router 600. According to Theorem 1 the number of queued cells per flow per router is bounded by 4K=16 in this example. FIG. 15F illustrates that every flow buffers at most 7 cells per router 600 even at 100% loads, several orders of magnitude less buffering than current IP routers require. The average number of queued cells per flow-VOQ per switch is 1.58 cells, well within the upper bound established in Theorem 1.

SUMMARY

While the exemplary embodiments of the present invention are described with respect to various equations and figures, the present invention is not limited to the form of these equations or figures. One skilled in the art may modify these equations or figures by scaling, or may form different approximate solutions to the methods described herein employing any of a number of techniques well known in the art.

The various methods could be implemented using hardware-based data processing means, including data processing logic in a Application Specific Integrated Circuit, a Field Programmable Logic Device, a Field programmable Gate Array, or any other hardware based data processing means.

The various methods could be implemented using software-based data processing means, including processing steps in a software program. Such software may be employed in, for example, a digital signal processor, a network processor, a micro-controller or a general-purpose computer.

The various methods can be employed in electrical routers, all-optical routers, or wireless routers.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling or a network, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the steps which have been described and illustrated in order to explain the nature of this invention may be made by those skilled in the art without departing from the principle and scope of the invention as expressed in the following claims. For example, the methods can be iterative or non-iterative, the methods may use fixed-size or variable-size packets, the methods may be embedded into Input Queued crossbar switches, internally buffered crossbar switches, or other switches which use Input Ports and virtual queues.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

The invention claimed is:

1. A method of transmitting a plurality of traffic flows to N output ports through a switch during a scheduling interval, comprising:

receiving each of said plurality of traffic flows, each of said plurality of traffic flows associated with a respective guaranteed data rate;

buffering packets in each of said plurality of traffic flows in one of N input queues, in dependence on the output port for that traffic flow;

in a switching interval, transmitting a packet from a chosen traffic flow from a selected one of said N input queues to the output port for that selected one of said N input queues;

wherein said chosen traffic flow is chosen as having the largest positive normalized service lag among traffic flows having buffered packets in said selected one of said N input queues, determined over a period of time from the beginning of the scheduling interval until the beginning of the switching interval;

wherein the normalized service lag of each traffic flow reflects the difference between the amount of traffic that could be transmitted at said flow's guaranteed data rate during said period and the amount of traffic from said flow transmitted through said switch during said period.

2. The method of claim 1, further comprising receiving an enable signal identifying the selected one of said N input queues for said switching interval.

3. The method of claim 2, wherein the enable signal is computed using a connection sequence, said connection sequence interconnecting each of said N input queues with each of said N output ports to provide a guaranteed rate of interconnection between each of said N input queues and each of said N output ports over multiple switching intervals.

4. A method of sending packets along a path in a network of routers, where at least one router uses the method of claim 3.

5. The method of claim 1, wherein packets in each flow have the same fixed size.

6. The method of claim 1, wherein the packets in each flow have a variable size.

7. The method of claim 1, further comprising logging which traffic flow is the chosen traffic flow for multiple switching intervals to form a schedule of flows.

8. The method of claim 1 further comprising maintaining a normalized service lag value for each of said plurality of traffic flows.

9. The method of claim 8, wherein a clock identifies the switching interval, and wherein the normalized service lag value of each of said plurality of traffic flows is updated in each cycle of said clock.

10. The method of claim 9, wherein the normalized service lag value of each of said plurality of traffic flows is updated by adding a value proportional to the duration of said cycle of said clock and proportional to that flow's guaranteed data rate.

11. The method of claim 8, wherein the normalized service lag value of each traffic flow in said selected one of said N input queues is updated in said switching interval.

12. A method of transmitting a plurality of traffic flows to N output ports, comprising:

receiving each one of said plurality of traffic flows, each one of said plurality of traffic flows associated with a respective guaranteed data rate;

buffering packets in each of said plurality of traffic flows in one of N input queues, in dependence on the output port for that traffic flow;

for each of said plurality of traffic flows determining an ideal packet departure time for each buffered packet in that flow that would provide for zero jitter for that flow, based on at least the guaranteed data rate for that flow;

during a switching interval, transmitting a chosen packet from a selected one of said N input queues to the output port for that selected one of said N input queues;

wherein said chosen packet is chosen among packets in said selected one of said N input queues, as the packet for which a normalized service lag is the largest positive value among packets buffered within said selected one of said N input queues, wherein the normalized service lag for each of said packets in said selected one of said N input queues reflects the current time minus that packet's ideal departure time in its flow, multiplied by the guaranteed data rate for that flow.

13. The method of claim 12, further comprising receiving an enable signal identifying the selected one of said N input queues for said switching interval.

14. The method of claim 13, wherein the enable signal is computed using a connection sequence, said connection sequence interconnecting each of said N input queues with each of said N output ports to provide a guaranteed rate of interconnection between each of said N input queues and each of said N output ports over multiple switching intervals.

15. A method of sending packets along a path in a network of routers where at least one router uses the method of claim 14.

16. The method of claim 12, wherein packets in each of said plurality of traffic flows have the same fixed size.

17. The method of claim 12, wherein the packets in each of said plurality of traffic flows have a variable size.

18. The method of claim 12, further comprising logging which one of said plurality of traffic flows is the chosen traffic flow for multiple switching intervals to form a schedule of flows.

19. The method of claim 12 further comprising maintaining a normalized service lag value for each of said plurality of traffic flows.

20. A method of computing a periodic flow schedule for F time slots, for transmitting a plurality of traffic flows buffered in N input queues to N output ports through a switch, said method comprising:

associating each one of said plurality of traffic flows with the one of said N input queues corresponding to the one of the N output ports required by that flow;

receiving for each of the plurality of flows, a guaranteed data rate corresponding to the number of packet transmissions required by that flow in said F time slots;

calculating from said associating and said guaranteed data rate for each flow, a cumulative data rate for each of the N input queues in said F time slots, corresponding to the number of packet transmissions required by each of said N input queues in said F time slots in order to satisfy said guaranteed data rate for all of the plurality of flows associated with that one of said N input queues;

receiving a connection schedule identifying a selected one of said N input queues in each of said F time slots, and satisfying the cumulative data rate requirement for each of the N input queues in said F time slots;

computing a periodic flow schedule, said periodic flow schedule identifying a chosen flow if any for each of said F time slots, said chosen flow associated with the selected one of said N input queues in the connection schedule for that time slot, said periodic flow schedule further satisfying the guaranteed data rate requirements of said plurality of flows in said F time slots;

storing said periodic flow schedule.

21. The method of claim 20, wherein the chosen flow for each timeslot is chosen as the flow having the largest positive normalized service lag in that time slot, among traffic flows associated with the one of said N input queues identified in the connection schedule for that time slot, wherein the normalized service lag of a traffic flow in a time slot $J<=F$ reflects the number of packets that the flow could transmit at the flow's guaranteed data rate over the period of time comprising time slots $1\ldots(F-1)$, and the cumulative number of packet transmissions allocated to that flow in accordance with said periodic connection schedule and said periodic flow schedule over the same period of time.

22. A method of sending packets along a path in a network of routers, wherein at least one router uses the method of claim 20.

23. A router comprising N input ports, M output ports and a switch, and memory controlling operation in said switch, said memory storing a processor executable instruction to perform the method of claim 20.

24. A method to compute a periodic flow schedule for F time slots for transmitting a plurality of traffic flows buffered in N input queues to N output ports through a switch, said method comprising:

associating a subset of said plurality of traffic flows with each of the N input queues, each of said subset of said plurality of traffic flows destined for the same output port;

receiving the guaranteed data rate of each flow of the plurality of traffic flows, where the guaranteed data rate of a flow corresponds to a number of packet transmissions required for the flow in a periodic schedule of F time slots;

calculating from said guaranteed data rate for each flow, a cumulative data rate requirement for each of the N input queues in said F time slots, corresponding to the number of packet transmissions required by each of said N input queues in said F time slots in order to satisfy said guaranteed data rate for all of the plurality of flows associated with that one of said N input queues;

receiving a periodic connection schedule of length F, identifying a selected one of the N input queues in each of F time slots, which satisfies the cumulative data rate requirement of each of the N input queues in said F time slots;

computing a sequence of theoretical packet transmission times for each flow of the plurality of traffic flows, the sequence of theoretical packet transmission times for each flow satisfying the guaranteed data rate requirement for that flow, and having zero jitter, and wherein each theoretical packet transmission time will be assigned in a unique time-slot in the flow-schedule;

for each time-slot in the connection schedule, choosing a flow associated with the selected input queue identified for that time-slot, for which a theoretical packet transmission time will be assigned onto that time slot;

wherein the chosen flow in the selected one of said N input queues in each time-slot is chosen as the flow with the next earliest unassigned theoretical packet transmission time;

storing the chosen flow for each of said F time slots.

25. A method of sending packets along a path in a network of routers, wherein at least one router uses the periodic schedule of claim 24.

26. A method of multiplexing N traffic flows onto one communication link, comprising:

receiving each of said N traffic flows, each of said N traffic flows associated with a respective guaranteed data rate;

buffering packets in each of said N traffic flows;

in a switching time, transmitting a buffered packet from a chosen one of the N traffic flows onto the communication link;

wherein said chosen one of said N traffic flows is chosen from said N traffic flows as the traffic flow with the largest positive normalized service lag among said N traffic flows;

wherein the normalized service lag of each of said N traffic flows at any time reflects the difference between the cumulative transmission capacity that the flow would be allocated through said communication link at the guaranteed data rate over a measurement interval ending at that time, and the cumulative transmission capacity allocated to that flow through said communication link during that measurement interval.

27. The method of claim 26, wherein said switching time is the period of a clock and wherein the normalized service lag value of each of said traffic flows is updated in each cycle of said clock.

28. The method of claim 27, wherein the normalized service lag value of each of said N traffic flows is updated by adding a value proportional to the product of the duration of said period of said clock and proportional to that flow's guaranteed data rate.

29. The method of claim 26, further comprising receiving an enable signal in the switching time identifying the selected one of said N traffic flows for that switching time.

30. The method of claim 29, wherein the enable signal is computed using a connection sequence, said connection sequence interconnecting each of said N traffic flows onto said one communication link to provide a guaranteed rate of interconnection between each of said N traffic flows and said one communication link over multiple switching intervals.

* * * * *